United States Patent [19]

Yoshikawa et al.

[11] Patent Number: 4,901,537
[45] Date of Patent: Feb. 20, 1990

[54] SOLAR HEAT COLLECTOR SYSTEM

[76] Inventors: Masaharu Yoshikawa, 1330-2 Toriya-cho, Kashiwara-shi, Nara-ken; Nobushige Arai, 3604-6 Kanmaki, Kanmaki-cho; Masafumi Satomura, 46-301, Kataokadai 3-1, Kanmaki-cho, both of Kitakatsuragi-gun, Nara-ken; Syozo Tanaka, 734 Kume-cho; Yoshiharu Shinobu, 785 Touichi-cho, both of Kashiwara-shi, Nara-ken; Akira Takushima, 24-506, Kataokadai 3-1, Kanamaki-cho, Kitakatsuragi-gun, Nara-ken; Nobuhiro Yanagisawa, 1765-2 Mise-cho, Kashiwara-shi, Nara-ken, all of Japan

[21] Appl. No.: 161,951

[22] Filed: Feb. 29, 1988

Related U.S. Application Data

[63] Continuation-in-part of Ser. No. 94,722, Sep. 9, 1987, abandoned, and a continuation of Ser. No. 720,701, Apr. 8, 1985, abandoned.

[30] Foreign Application Priority Data

| Sep. 18, 1984 | [JP] | Japan | 59-195599 |
| Sep. 18, 1984 | [JP] | Japan | 59-195600 |
| Sep. 18, 1984 | [JP] | Japan | 59-195601 |
| Sep. 18, 1984 | [JP] | Japan | 59-195602 |
| Sep. 18, 1984 | [JP] | Japan | 59-195603 |
| Oct. 23, 1984 | [JP] | Japan | 59-160739[U] |
| Feb. 15, 1985 | [JP] | Japan | 60-28929 |

[51] Int. Cl.⁴ .......................................... F25B 27/00
[52] U.S. Cl. .................................. 62/235.1; 237/2 B; 236/20 R
[58] Field of Search ............... 62/235.1, 238.6, 324.1; 237/2 B; 236/20 R, 23

[56] References Cited

U.S. PATENT DOCUMENTS

| 4,254,822 | 3/1981 | Geier | 237/2 B |
| 4,392,359 | 7/1983 | Franklin | 62/235.1 |
| 4,481,788 | 11/1984 | Yoshino | 237/2 B |
| 4,505,328 | 3/1985 | Schmitt | 237/2 B |

*Primary Examiner*—Henry A. Bennett

[57] ABSTRACT

A solar heat collector system including a heat collector circuit containing a compressor that compresses and outputs thermal media and is capable of varying its own capacity by conversion of operative frequencies; a condensor being part of the heat collector circuit, which is connected to the output of the compressor; a plurality of heat collectors integrally built with housing materials, one end of which being connected to the condensor via a squeezer and the other end of the heat collector system being connected to the compressor, where each unit heat collector contains a plurality of thermal media tubes allowing thermal media to pass through the inside thereof and heat collect fins connected to the thermal media tubes for transferring heat; a hot-water pool storing hot water for use inside the house; and a fluid heating circuit inclusive of a fluid heater held in heat-exchange relationship with the condensor outside of the hot-water pool.

4 Claims, 19 Drawing Sheets

FIG.17
FIG.18
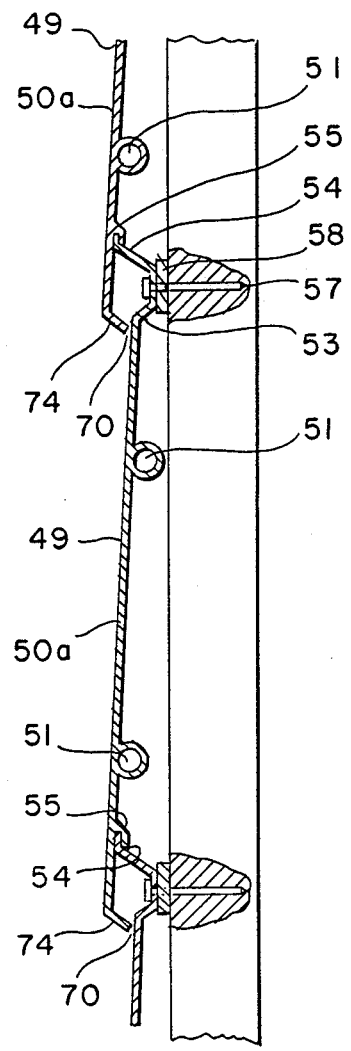
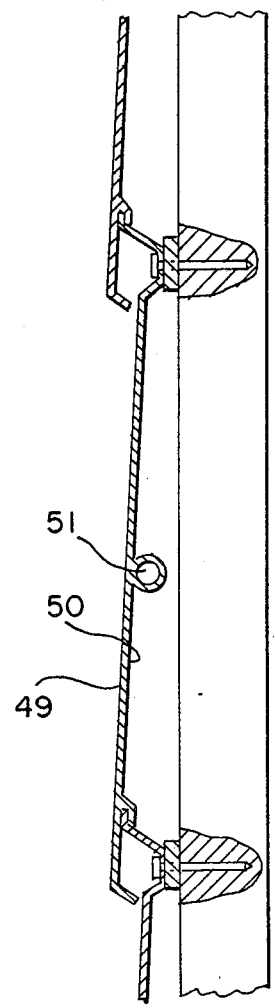

FIG. 24(a)
FIG. 24(b)
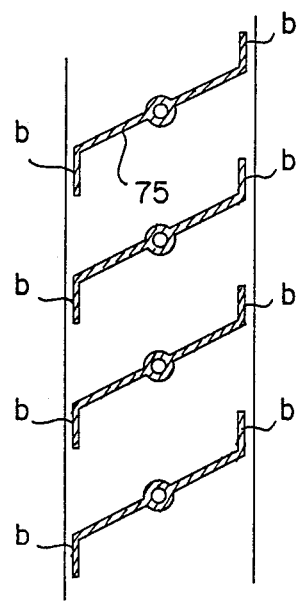
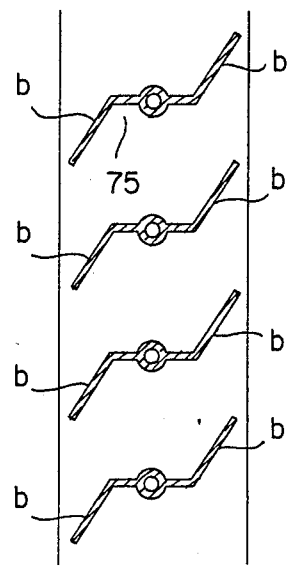
FIG. 24(c)
FIG. 24(d)
FIG. 24(e)
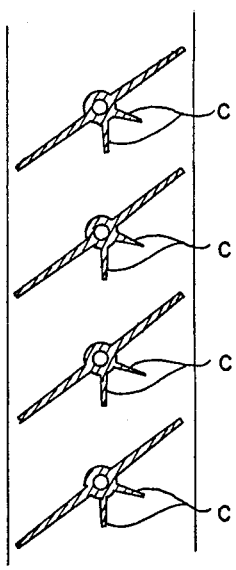
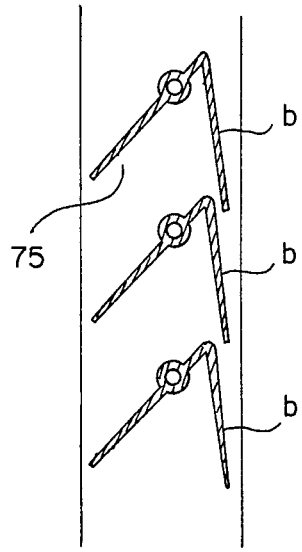
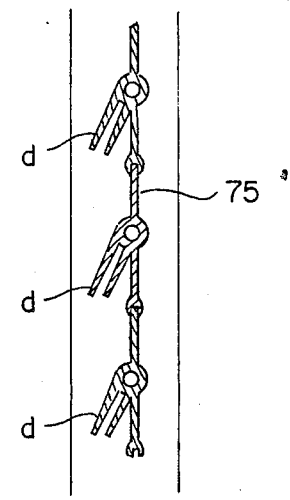

SOLAR HEAT COLLECTOR SYSTEM

This application is a continuation-in-part of Ser. No. 094,722 filed Sept. 9, 1987, and a continuation of Ser. No. 720,701 filed Apr. 8, 1985, both now abandoned.

BACKGROUND OF THE INVENTION

The present invention relates to a solar heat collector system that generates heat-pump cycles by sequentially coupling a plurality of solar heat collectors comprised of a compressor, a condenser, an expansion valve, and an evaporator, for heating fluid such as water in the condenser by collecting heat from solar beams and the atmosphere for delivery to hot-water supply systems and/or indoor air-conditioners.

Any conventional solar heat collector system uses either water or air as heating media by causing such heating media to circulate through a heat collector installed on the roof of a building to absorb heat from sun beams, allowing the absorbed heat to be transferred into a heat pool using heat media in order to use heated air or water for the hot-water supply system or indoor air-conditioners. When operating such a system, since the temperature of the heating media passing through the solar heat collector becomes higher than the atmospheric temperature due to the function of the heating media, a conventional heat collector needs a variety of heat-insulation structures to minimize radiation of heat from the heating media when collecting the heat, and yet, such heat-insulation structures are expensive and heavy. In addition, since heat collected is only from solar beam radiation, the heat collection capacity of any conventional solar heat collector system varies significantly according to weather conditions. Thus, any such conventional solar heat collection system needs to provide an auxiliary heating source to compensate for the shortage of calories when sufficient heat from sunbeams can not be collected.

Recently, independent of these, a new type of solar heat collector system has also been developed, which generates heat-pump cycles by sequentially coupling a compressor using freon gas (chlorofluoro hydrocarbon) for the heating media, a condenser, an expansion valve and an evaporator. Since this system uses such a heat pump cycle by applying evaporation and condensation of heating media, by properly adjusting the temperature of the evaporated heating media inside the heat collector (evaporator), not only the solar heat, but atmospheric heat can also be absorbed, thus dispensing with insulation of the heat collector board and of the selective absorption film as well. In order to positively absorb atmospheric heat, it is desirable to expand the area of the heat collector board in contact with the atmosphere an provide a well-ventilated configuration. Such a new system eliminates glass, cases, insulation material or the vacuum process otherwise needed for conventional plain-board type heat collectors and vacuum glass tubes, thus drastically reducing the cost of heat collectors. In addition, since the total weight is greatly reduced, installation costs can be lowered. Such a new system also makes it possible to collect atmospheric heat in addition to solar heat, and it thus effectively collects heat even when the heat from sunbeams is extremely scarce, or during cloudy periods, without resorting to any auxiliary heating source, thus saving on costs otherwise needed for the installation of such auxiliary heating sources, and for fuel. Since the new system uses freon gas for its heating media, it dispenses with methods of preventing freezing and corrosion that unavoidably occurs in tubes during winter when using water for the heating media. FIG. 1 is a perspective view of the heat collector of this system and FIG. 2 a sectional view. A heat collector of this type is provided with a plurality of heat collectors (3) comprising the heating media tube (1) and a fin (2) these heat collectors (3) being installed in parallel to a pair of base plates (4). This system sequentially connects adjacent heating media tubes secured to the base (5) or a number of fins (7) secured at right angles to the heating media tube (6) which is installed in the form of a snake movement, as shown in FIG. 3. Nevertheless, when such a heat collector system featuring the above configuration is installed on the roof of a conventional house or other building, it may adversely affect the appearance of the building when compared to conventional plain-type heat collectors or heat collectors using a heat collector incorporating vacuum glass tubes. Likewise, when installing this heat collector system on a newly-built house, just as for conventional heat collectors, the owner needs to pay the price of the heat collectors together with the price of the roofing material. In contrast to a conventional heat-pumping air-conditioner using air or water as a heating source, the effectiveness of heat collectors (evaporators) of heat-pump type heat collector systems is variable being affected both by atmospheric or water temperature, as well as by the amount of sunbeam radiation. As a result, the variable range is extremely wide. In other words, when a sufficient amount of sunbeams can be collected and the atmospheric temperature rises, the heat collection capacity sharply increases. Conversely, the heat collection capacity significantly decreases when sufficient sunbeams cannot be received or atmospheric temperature is low. In many cases, the amount of sunbeams is widely and quickly variable, thus making it difficult to adequately control the cycle of the heat pump operation. Likewise, the load from hot-water supply systems and air-conditioning varies according to seasonal factors. In this case, the maximum load is required throughout the winter season, decreases during spring and autumn and is reduced to minimum levels during the summer season. In other words, as in the case of conventional heat collector systems, the heat collection capacity of a direct-expansion heat-pump system heat collector of this kind has inverse characteristics to those necessary, whereby its load capacity decreases during winter, when a greater load is required, and increases during the summer when the least load is required. In addition, since such a heat collector system rotates the compressor using the power for collecting heat by forming a heat-pumping cycle, compared to the pump input of conventional heat collector systems using water for the heating media, this system consumes a large amount of power. As a result, it not only absorbs heat from solar beams, but it also absorbs atmospheric temperature. Nevertheless, since a specific amount of power is constantly needed even during summer, or when sufficient sunbeams are available, compared to such conventional heat collector systems using water for the heating media, this system is obliged to consume a large amount of power even during summer, and when sufficient sunbeams are available, thus eventually resulting in quite uneconomical operation throughout its service life.

SUMMARY OF THE INVENTION

In light of the disadvantages thus described, the present invention aims at providing an improved heat collector system featuring the following:

(1) An improved solar heat collector system that completely eliminates visual unattractiveness with the house, providing a pleasant appearance by being effectively incorporated into part of the house itself, such as the roof, a wall, or handrail of a balcony, and yet providing substantially improved economy;

(2) An improved solar heat collector system capable of varying the heat collection capacity in response to the variable load depending on seasonal factors, so that a heat collection capacity compatible with load can be ensured throughout the year, featuring the unique capability of restraining input by effectively applying sunbeam heat and maintaining a highly operative coefficient covering a long period of service life, and the providing economy and (3) An improved solar heat collector system capable of quickly counteracting such rapidly and widely variable heat collection conditions due to the variable amount of sunbeams radiated, thus making it possible to perform an optimum heat pumping cycle constantly.

Other objects and further scope of the applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the objects described above, the present invention provides an improved solar heat collector system comprising: a heat collector circuit comprising a compressor that compresses and outputs heating media, a condensor connected to the output of the compressor, and a heat collector having one end connected to the condensor via a squeezer unit and the other end to the compressor; a hot-water pool; and a fluid heating circuit comprising a fluid heater which is connected to the above condensor by forming the heat-exchange relationship outside the hot-water pool. The heat collector is comprised of a heating media tube allowing the heating media to pass through it and a heat collection fin connected to the heating media tube so that heat can be transferred to it. The heat collector is shaped similar to housing materials such as roofing material or external wall materials so that it can harmoniously make up an integral part of the house either in the form of roofing material or wall material, thus providing dual functions, being a heat collector itself and part of the housing materials as well. Consequently, heat collectors embodied by the present invention do not cause unattractiveness with the overall view of the house after installation compared to those conventional heat collectors on the roof, thus securely providing a very satisfactory design and pleasant appearance by being incorporated integrally in the house configuration. In addition, since the heat collector embodied by the present invention is provided with dual functions, being the heat collector and part of the housing materials as well, it sharply reduces the overall cost needed for the housing and heat collector so that total economy can be achieved. Furthermore, the heat collector embodied by the present invention is not only capable of completely being incorporated in the roof or wall of a house, but it is also possible for it to be integrally set up together with balcony handrails and the like, or with an external fence. Practical examples of applying heat collectors to these housing components are described later.

The preferred embodiment of this invention uses a compressor capable of adequately controlling heat-load capacity by conversion of frequencies, which effectively responds to variable load and atmospheric conditions, while securely strengthening the heat collection capacity during winter when this capacity lowers by raising the operative frequencies of the compressor, and conversely, it causes the heat collection capacity to lower during summer season when this capacity grows with the reduced load by lowering the operative frequencies of the compressor so that excessive heat cannot be collected and the electrical input load against the compressor can also be reduced. As is clear from the above, the heat collector embodied by the present invention is provided with an optimum heat collection capacity correctly matching variable loads throughout the year and satisfactory operative results during a long period of service life. As one of the effective means for controlling the capacity of the compressor, a controller is provided for controlling the capacity of the compressor by correctly sensing the atmospheric temperature and the amount of sunbeams receivable, where the controller causes the number rotations of the compressor motor to decrease when the atmospheric temperature rises and a large amount of sunbeams are available. Conversely, it causes the number rotations of the compressor motor to increase when the atmospheric temperature lowers and sunbeams are insufficiently available.

Another control means is comprised of the compressor capacity controller circuit which controls the capacity of the compressor by using output signals from the first and second temperature detectors provided for at the inlet an outlet of the fluid heater. This controller circuit computes the heating capacity of the heat collector circuit based on the difference of temperature detected by the first and second detectors, and then outputs the capacity control signal to the compressor so that the heating capacity can always remain at the predetermined capacity level.

The mechanism described above is designed to adequately control the capacity of the compressor in order that the heating capacity of the fluid heater can always be maintained at the predetermined level set relative to load. This is based on a mechanism in which variation of the amount of received sunbeams and atmospheric temperature can be represented in terms of the variation of the heating capacity of the fluid heater itself. To implement this configuration more practically, the third temperature detector is provided for sensing the fluid temperature in the hot-water pool, and accordingly, a circuit for controlling the capacity of the compressor using signals from the first, second and third detectors is provided. This control circuit detects the actual fluid temperature of the hot water pool by way of the relevant temperature detector, and then computes the needed heating capacity in reference to the difference between the detected temperature and the objective or desired fluid temperature as well as the remaining period of time from the present to the time expected to reach the eventual temperature desired.

In addition, this control circuit also computes the heating capacity of the heat collector circuit based on the temperature detected by the first and second detectors before eventually sending out the capacity control signal to the compressor in order that the heating capacity can correctly match the capacity level desired. In other words, the control circuit computes the needed heating capacity in reference to the expected temperature to be reached and the time needed for the heating operation by correctly sensing the fluid temperature of the hot-water pool to properly control the capacity of the compressor so that the heating capacity of the fluid heater can correctly match the needed heating capacity. This enables the system to effectively deal with daily variations of the needed amount of fluid to be heated when some fluid still remains left in the hot-water pool.

As a variation of the control system, the control circuit first detects the fluid temperature of the hot-water pool via signals from the third temperature detector, and then computes the objective heating capacity based on the difference of the detected temperature and the objective heating temperature and is also based on the heat collection time from the start of the heating operation to the predetermined time to terminate the heating. It is also possible to have the control circuit compute the heating capacity of the heat collector circuit based on temperature detected by the second temperature detector and then output the capacity control signal to the compressor in order for the heating capacity to correctly match the objective heating capacity. This effectively provides the same effect as that which can be realized using the above control system.

The condensor incorporated in the solar heat collector system embodied by the present invention is integrally combined with the fluid heater described above and is capable of maintaining the heat-exchange relationship between these, and therefore, it is substantially such a heat-exchanger exchanging heat between the heat collector circuit and the fluid heating circuit. Actually, the condensor incorporated in this system has the dual-tube heat-exchange configuration in which the heat collector circuit and the fluid heating circuit both cause heat to be transferred in the directions opposite from each other.

The squeezer unit incorporated in the solar heat collector system embodied by the present invention essentially comprises the expansion valve provided with a motor driver which is a stepping motor operated by pulse signals from the control circuit. The first and second temperature detectors are respectively installed at the inlet and outlet of the heat collector of the heat collector circuit, while the control circuit detects the difference of temperature at the inlet and outlet of the heat collector after both the first and second detectors have sensed temperature, and finally the control circuit outputs the control signal to the motor driver. Conventionally, either a capillary tube or a thermally responsive automatic expansion valve has been used for expanding the heat-pump cycle of this kind. However, when compared to the heat collector system embodied by the present invention, all of these proved to be still inadequate in effectively and quickly controlling widely and rapidly variable heat-collecting conditions related to atmospheric temperature and the amount of receivable sunbeams.

The expansion valve control circuit embodied by the present invention also outputs control signals by detecting the difference in temperature between the inlet and outlet of the heat collector, as in the case of conventional thermal expansion valves, in order that the predetermined heating level (being the difference in temperature between the inlet and outlet of the heat collector) can be correctly reached. However, the preferred embodiments of the present invention provide such a system that outputs the decompress-control signal to the expansion valve driver so that the difference in temperature between the inlet and outlet of the heat collector detected by the second temperature detector can be constantly held at the desired value according to the capacity control signal from the capacity controller of the capacity-variable compressor. In other words, such a control circuit has been provided to allow control of the expansion valve related to the capacity control signal of the compressor in order that the optimum objective value of the difference of temperature variable according to the variation of the capacity of the capacity-controlled compressor be held constant.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 11 (a), (b), and (c) are respectively charts showing different examples of the divided zone of deviation between the difference in temperature and the objective value of the difference in temperature;

FIGS. 17 and 18 are respectively sectional views of still further preferred embodiments of the heat collectors reflecting the present invention;

FIGS. 24 (a), (b), (c), (d), and (e) are respectively the sectional views of heat collectors reflecting still further embodiments of the present invention;

DETAILED DESCRIPTION OF THE INVENTION

Figure 1:
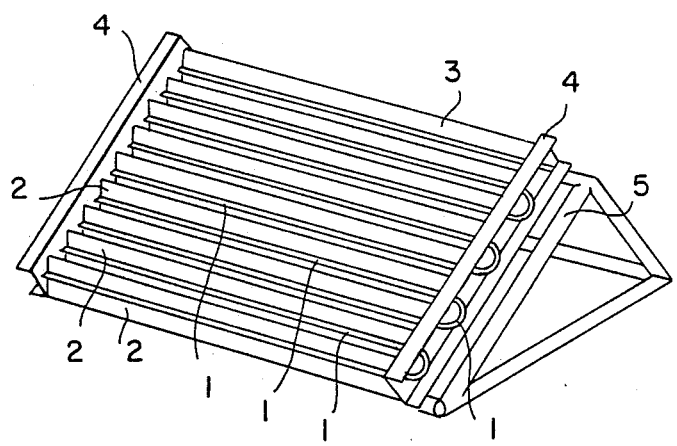
FIG. 1 is a perspective view of a heat collector of a heat collector system applying conventional heat-pump cycles.
Figure 3:
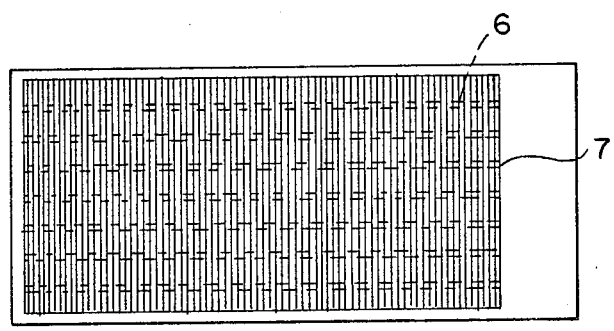
FIG. 3 is the front view of the heat collector of a heat collector system applying conventional heat-pump cycles.
Figure 2:
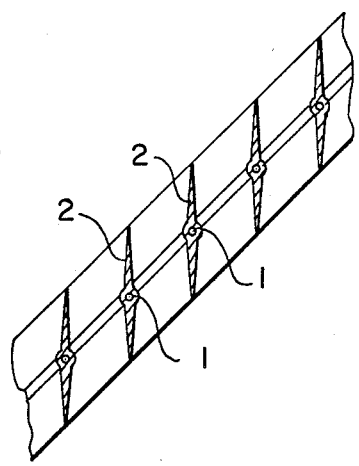
FIG. 2 is an enlarged sectional view of the main part of a conventional heat-collector system.
Figure 4:
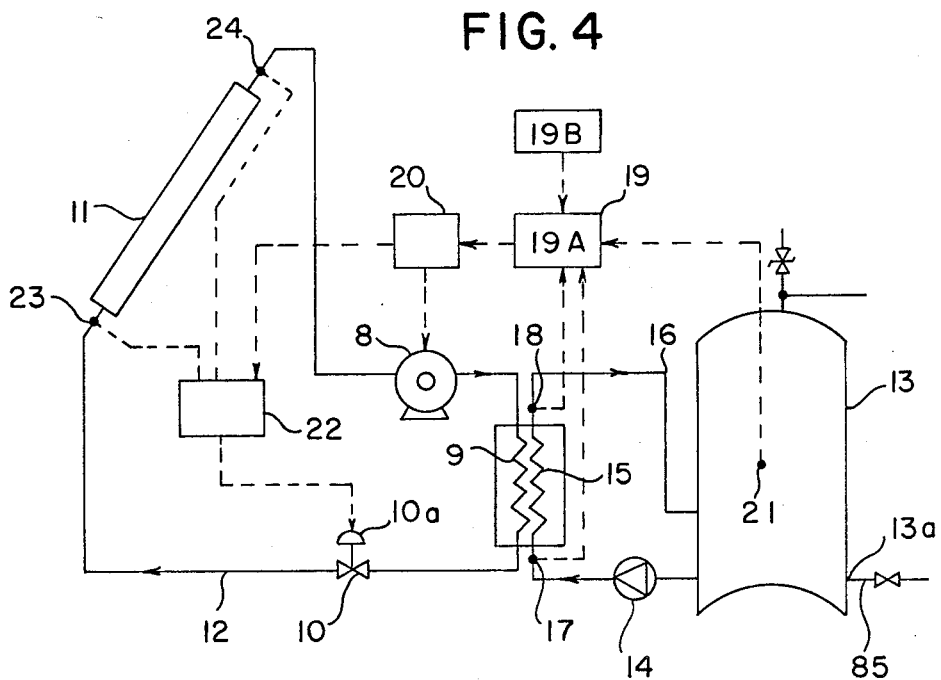
FIG. 4 is the configuration of the heat collector system reflecting one of the preferred embodiments of the present invention.
Figure 5:
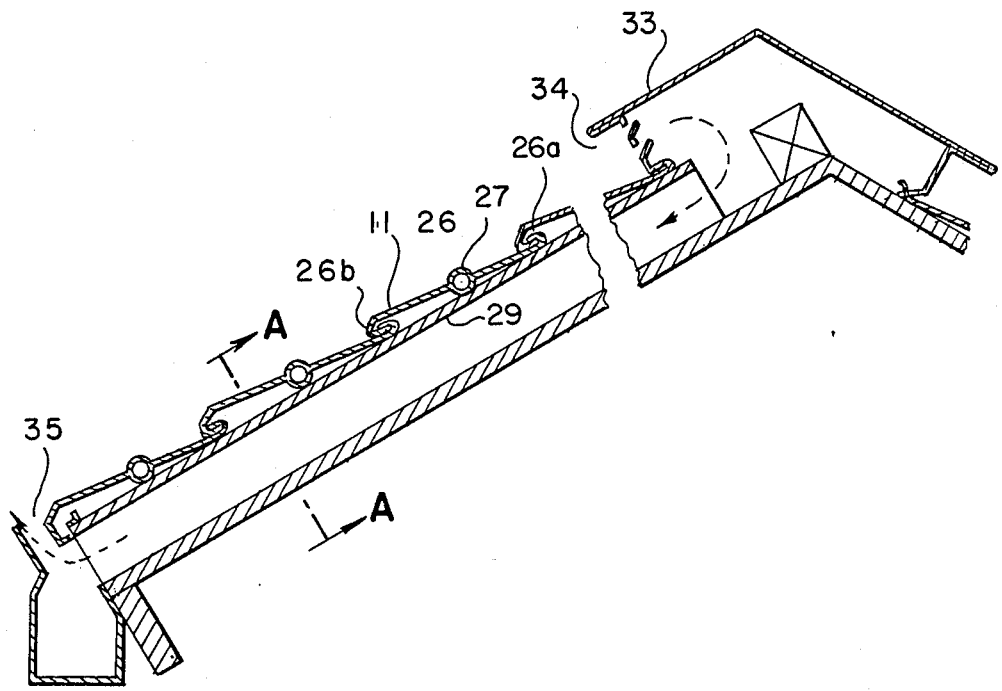
FIG. 5 is the sectional view of the installed heat collector.
Figure 6:
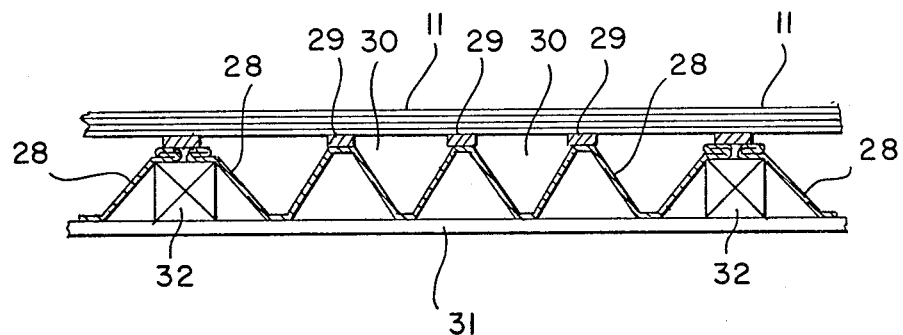
FIG. 6 is the sectional view taken on line A—A of FIG. 5.
Figure 7A:
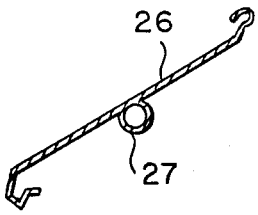
FIG. 7a,b,c,d,e,f and g are the actual states in which the heat collector has been installed.
Figure 7B:
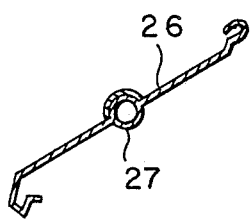
Figure 7C:
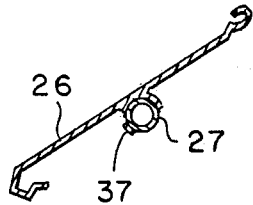
Figure 7D:
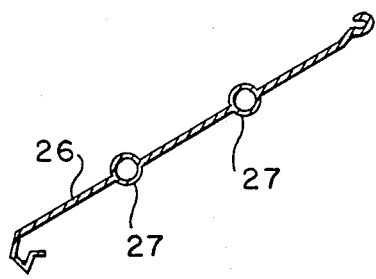
Figure 7E:
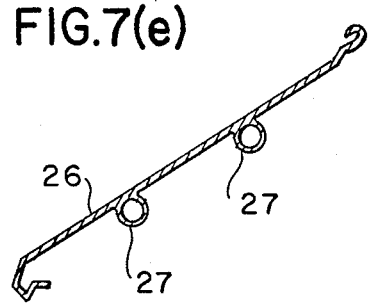
Figure 7F:
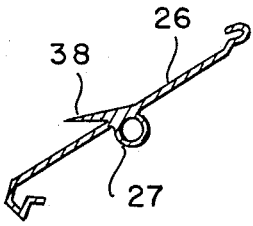
Figure 7G:
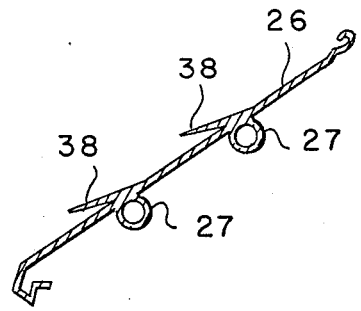
Figure 8:
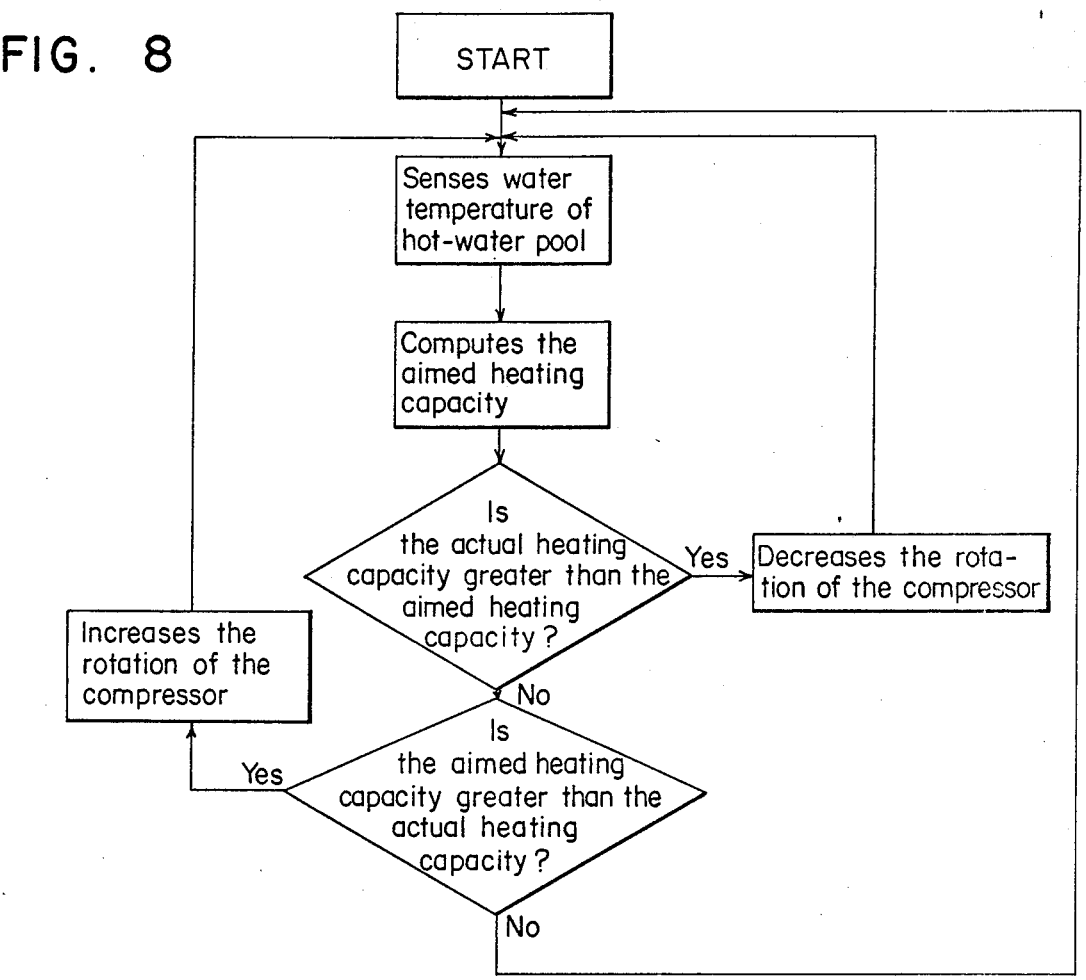
FIG. 8 is the flowchart describing the procedure needed for controlling the capacity of the compressor.

Referring now to the attached drawings, the preferred embodiments of the present invention are described below. FIG. 4 shows the systematic diagram of one of the preferred embodiments of the present invention. The solar heat collector system reflecting the preferred embodiments of the present invention makes up the heat-pump system heat collector circuit (12) by sequentially connecting a compressor (8) that compresses and outputs heating media, a condensor (9) connected to the output of the compressor (8), an expansion valve (10) concurrently functioning as the squeezer, and the heat collector (11) that also concurrently functions as an evaporator, respectively. In addition, this system also incorporates the fluid heating circuit (16) by connecting the hot-water pool (13), storing fluid for delivery to the hot-water supply unit and air-conditioners, and the fluid heater (15) installed in a position outside the hot-water pool (13) via a circulation pump (14) and connected to the condensor (9) with which the heat-exchange relationship is formed. FIGS. 5, 6 and 7 respectively show the configuration of the heat collectors (11) of the solar heat collector system embodied by the present invention. FIG. 5 shows the sectional view of the main part of the preferred embodiment of the heat collector system reflecting the present invention, whereas FIG. 6 shows the sectional view of the heat collector taken on line A—A of FIG. 5. The heat collector shown in FIGS. 5 and 6 concurrently functions as an evaporator that can be installed on top of a roof. The heat collector (11) is made of aluminum, copper or the like, featuring satisfactory thermal conductivity, and is typically comprised of a sheet-shaped fin (26) set in a horizontal direction, and a thermal media tube (27) which is integrally formed in the center of the fin unit (26). The surface of the heat collector (11) is finished with dark colored coating featuring durable weatherability or with colored aluminum oxide in order for the absorption of radiated sunbeams to be securely improved. A U-shaped upper coupler (26a) extending upward is provided at the upper end of the fin unit (26), and conversely, a lower coupler (26b) also U-shaped, extending downward is also provided at the bottom end of fin unit (26) so that the upper and lower heat collectors (11) adjacent to each other can be coupled together by engagement of the upper and lower couplers (26a) and (26b). Reference number 28 indicates the dew receiver sheet supporting the heat collectors (11) via the supporter member (2) made of synthetic rubber, "Neoprene" for example. The dew receiver sheet (28) is zigzag-shaped, while space (30) is provided between the heat collector (11) and the dew receiver sheet (28). Since the dew receiver sheet (28) supports the heat collectors (11) via the Neoprene support member (29), this support member (29) concurrently functions as an insulator, so that heat can be shielded from the dew receiver sheet (28). Reference number 31 indicates the outdoor plate supporting the dew receiver sheet 28, while reference number 32 indicates the roof plate supporting rod, 33 the peak protector located on the tip portion of the roof, and reference number 34 indicates the ventilation hole through which atmospheric air is sent to space 30 and passes through it vertically downward before eventually being sent out of the exhaust outlet (35) located in the bottom part. Reference number 36 indicates a tub provided in the bottom part of the dew receiver sheet (28), while it collects rain water flowing over the surface of the heat collector (11) that makes up part of the roofing material and dew water behind the heat collector (11) caused by the temperature of the heat collector being lower than the atmospheric temperature. When actually installing the heat collector (11) shown in FIG. 5, it is also possible to incorporate the thermal media tube (27) so that it can be integrally shaped on the lower surface of fin unit (26) via an extrusion process as shown in FIG. 7 (a) or by causing the center part of the fin unit (26) to be expanded in the direction of the upper surface to form a semi-sphere as shown in FIG. 7 (b) before coupling the expanded part to he thermal media tube (27), or by installing the U-shaped supporting member (37) onto the bottom surface of fin unit (26) so that the supporting member (37) can be secured to the thermal media tube (27) as shown in FIG. (c). FIGS. (d) and (e) represent such a case in which two units of the thermal media tubes (27) are installed onto a piece of the heat collector, whereas FIGS. (f) and (g) denote such a case in which the thermal media tube (27) is installed onto the lower surface of fin unit (26) and the auxiliary fin (38) is installed on the upper surface of fin unit (26) as well. The auxiliary fin unit (38) improves the capacity of the heat collector when collecting heat from the atmosphere by enlarging the surface area of the heat collector (11) and promotes the exchange of heat with air in contact with the surface of the heat collector (11). The auxiliary fin (38) is installed onto fin unit (26) from the front of the heat collector (11) at an acute angle "α". Such an acute angle "α" can be set by allowing the upper surface of the auxiliary fin (38) to incline downward from the tip portions that the upper part of the auxiliary fin (38) can be protected from water deposits and/or dust. Since the thermal media tube (27) of the heat collector (11) shown in FIG. 7 (a), (c), and (e) is secured to the bottom surface of fin unit (26), the front surface of fin (26) becomes almost flat by concealing the thermal media tube (27) from the front surface. As a result, this provides a quite pleasing appearance when these are actually employed as part of the roofing material because the entire appearance is exactly identical to that of any conventional roofing materials. The fin unit of the heat collector system can be made into such a shape shown in FIG. 7 (b) via a rolling or pressing process against a thin sheet which is preliminarily surface-treated by coating, in addition to the extrusion process mentioned earlier.

Next, the operation of the solar heat collector system is described. Referring to FIG. 4, gaseous heating media of high temperature and being compressed by the compressor (8) is led into the condenser (9) and exchanges heat with fluid (water) flowing through the liquid heater, and then the gaseous thermal media is condensed into a liquid, which is heat-insulated, and expands itself when passing through the expansion valve (10). It is then decompressed to become non-evaporated thermal media of low temperature and low pressure. The thermal media is then fed into the heat collector (11) where it collects heat from sunbeams and the atmosphere so that it again turns into gas and enters into the compressor before starting to repeat the same cyclic operations mentioned above. On the other hand, water stored in pool (13) is delivered to the fluid heater via the circulation pump (14), and after being heated by the fluid heater, hot water is again sent back to the water pool (13). Since the thermal media flowing through the thermal media tube (27) is of low temperature and low pressure, temperature in the solar heat collector (11) becomes lower than the atmospheric temperature. As a result, dew may be generated on the surface of the heat collector (11). However, dew gradually evaporates itself and also flows down so that it can be collected by the tub (36). Since the temperature of the heat collector (11) is lower than the atmospheric temperature, air flowing through space (30) behind the heat collector (11) is cooled, thus causing air to flow down due to varied specific gravity. Because of this, air from space (30) is sent out of the exhaust outlet (35). Conversely, due to the down-flow of air, atmospheric air is fed into space (30) from the upper ventilation inlet (34), thus promoting heat-exchange with atmospheric air behind the heat collector (11), and at the same time, heat is also collected from incoming air behind the heat collector (11). As described earlier, since the heat collector (11) is concurrently part of the roofing material, house construction workers can concurrently execute both the installation of the heat collector (11) and the roofing operation, thus greatly simplifying the operation. Above all, after completing the installation work, the house provided with the solar heat collector system embodied by the present invention will offer such a pleasant and neat appearance without objectionably being disturbed by presence of the heat collector system.

The compressor (8) of the heat collector system embodied by the present invention is provided with variable capacity. The first temperature detector (17) is set to the inlet of the fluid heater (15) and the second temperature detector (18) to the outlet of this fluid heater (15), whereas the third temperature detector (21) is provided for detecting the temperature of fluid stored in the hot-water pool (6). The compressor capacity control circuit (19) controls the capacity of the compressor (8) by sensing signals from these temperature detectors (17), (18) and (21), first detects the actual fluid temperature of the hot-water pool (13), and then computes the desired heating capacity in reference to the difference of temperature between the detected temperature and the objective temperature to be reached and also in reference to the remaining heating time from the present to the expected time at which the desired temperature can be reached. The control circuit (19) also computes the heating capacity of the heat collector circuit (12) based on such temperature detected by the first and second temperature detectors before eventually delivering the capacity control signal to the compressor (8) so that the heating capacity can correctly match the heating capacity desired.

The compressor capacity control circuit (19) is comprised of the objective temperature and heating time provider (19B), the main control circuit (19A), and the frequency converter circuit (20), respectively. The main control circuit (19A) computes the heating capacity based on the difference of temperature detected by the first and second detectors (17) and (18), and then outputs the control signal in response to the desired heating capacity computed by the predetermined temperature and heating time provider (19B) and the third temperature detector (21). The frequency converter circuit (20) outputs the operative frequency signal to the compressor (8) in accordance with the signal sent out of the main control circuit (19A). The main control circuit (19A) is comprised of a single-chip microcomputer for example, which is internally provided with a data RAM, a program ROM, and ALU, and being driven by the clock oscillation circuit. The frequency converter circuit (20) is essentially made of an inverter circuit for example, which outputs such a signal converting the three-phase AC power frequency used by the motor that drives the compressor (8). Temperature detectors (17), (18), and (21) are comprised of thermistors for example. When voltage drops due to varied temperature, this is detected by these thermistors which then convert this data into digital values for delivery to the main control circuit (19A). The desired heating capacity is determined by the following process. The desired heating capacity is computed based on the heating load that can be determined by the presently available capacity of the hot-water pool and the remaining heating time which is actually the difference between the present time and the expected time at which the desired temperature is reached.

$$\text{Heating load} = \text{(desired temperature} - \text{average fluid temperature of the hot-water pool at the present time)} \times \text{presently available capacity of the hot-water pool}$$

$$\text{Desired heating capacity} = \frac{\text{Heating load}}{\text{Remaining heating time}}$$

Figure 9:
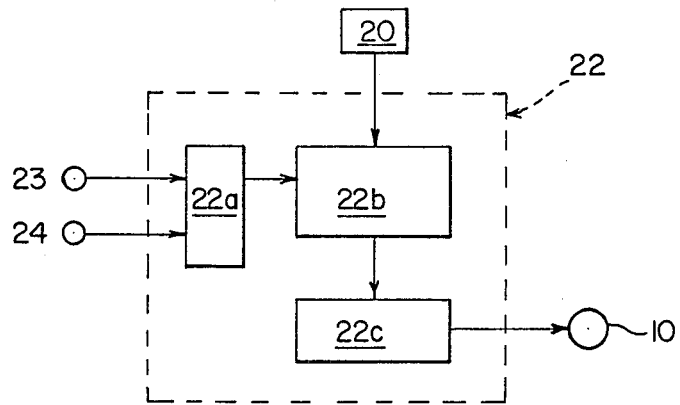
FIG. 9 is the configuration of the heating media flow volume control circuit.
Figures 10, 11A, 11B, 11C:
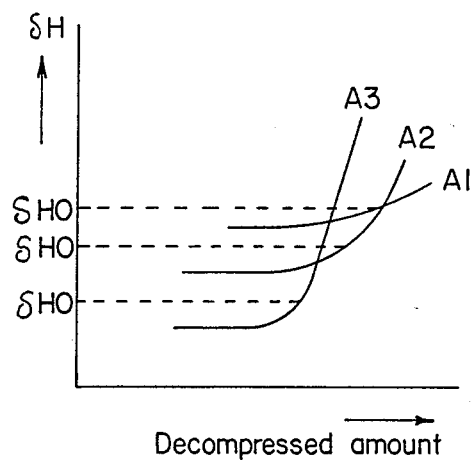
FIG. 10 is the chart showing the relationship between the difference in temperature and the amount of decompression.

Data representing the actual temperature at the inlet and outlet of the fluid heater (15) is delivered to the main control circuit (19A) via the first and second temperature detectors (17) and (18), respectively. The main control circuit (19A) constantly senses the actual heating capacity based on the difference of temperature and the fluid volume which is preliminarily set at a constant level. By applying this method and being based on the average water temperature of the hot-water pool and at present detected by the third temperature detector, and also in reference to the desired temperature to be reached, the expected time at which the desired temperature is reached, and to the present time, the control circuit (19) computes the desired heating capacity, which is then delivered to the main control circuit for storage in the memory. The control circuit (19) then controls the number of rotations of compressor (8) in response to varied atmospheric conditions and the conditions of the water that absorbs heat. When the sunbeams increase and the atmospheric temperature rises, and after the amount of heat has increased in the heat collector (11), the control circuit (19) causes the rotation of the compressor (8) to decrease, and as a result, the amount of load, i.e., power consumption, can be reduced to drive the compressor (8) at a highly operative coefficiency. Conversely, when the amount of sunbeams decreases and the atmospheric temperature lowers, the control circuit (19) causes the number of rotations of the compressor (8) to increase, thus increasing the load of the compressor (8) until the aimed heating capacity can be reached. When fresh water is supplied to the hot-water pool while heat collection is underway, the hot water temperature will be lowered, thus causing the heating load to rise. To compensate for this, the number of rotations of the compressor (8) can be increased to strengthen the heating capacity. FIG. (8) shows a flowchart describing the procedure needed for controlling these operations. Geseous thermal media bearing high temperature and being pressurized by the compressor (8) flows into the condensor (9) in which gaseous thermal media exchange heat with fluid (water) flowing through the fluid heater (15) which remains in the heat-exchange relationship itself. Gaseous thermal media then condenses so that they again turn liquid. The condensor (9) and the fluid heater (15) are built together integrally, thus making up a dual-tube heat-exchanger in which the heat collector circuit and the fluid heating circuit cause fluid to run in the direction opposite from each other. The dual-tube heat-exchanger is provided with either narrow slits or a number of minute projections throughout the internal surface of the thermal media tube so that both the condensation and thermal transfer of the thermal media can be securely promoted. After being condensed by the condensor (9) and again turning into liquid, the thermal media is then insulated from heat and expands when passing through the expansion valve 10, and then it is decompressed before eventually becoming non-evaporated thermal media containing low temperature and low pressure. The expansion valve (10) employed for the solar heat collector system embodied by the present invention aims at effectively dealing with such widely and sharply variable heat collection conditions due to varying atmospheric temperature and the amount of sunbeams receivable. To achieve this, the expansion valve (10) is provided with a motor driver (10a) having a widely controllable range and quick response characteristics, which is mainly comprised of a stepping motor being operated by pulse signals from the control circuit (22). The first temperature detector (23) and the second temperature detector (24) are respectively set to the inlet and outlet of the heat collector (11) of the heat collector circuit (13). The control circuit (22) senses the difference in temperature between the inlet and outlet of the heat collector (11) detected by these before sending out signals to the motor driver (10a) for controlling the open-close operation of the expansion valve (10). Generally, any expansion valve performs decompression for controlling temperature of the inlet and outlet of the evaporator (heat collector) so that the difference in temperature (the overheated condition of thermal media) can be held constant. Although the solar heat collector system embodied by the present invention can also perform such a control operation mentioned above, since the present invention provides a capacity-variable compressor (8), control circuit (22) is specifically provided which is capable of adequately controlling the expansion valve (10) in conjunction with the capacity control signal against the compressor (8) in order for the difference in temperature at the inlet and outlet of the heat collector to match the optimum target value of the difference in temperature which is variable in accordance with the varying capacity of the compressor (8). The method of controlling the expansion valve (10) is described below. FIG. 9 is a block diagram of the control circuit (22), in which reference number 22a indicates the A/D converter that converts the analogue data of temperature T1 and T2 detected by the first and second temperature detectors (23) and (24) into digital values. Reference number 22b indicates the main control circuit of the microcomputer. The main control circuit (22b) first processes the decompression control signal for delivery to the driver (10a) of the expansion valve (10) in accordance with the preset program by referring to the digitally converted signals fed from the first and second temperature detectors (23) and (24) and also to the capacity signal from the compressor capacity control circuit (19) which shows the drive capacity of the compressor (8), and then the main control circuit (22b) outputs the results to the output converter (22c) digitally. The output converter (22c) converts the received digital signal into one suited for properly driving the driver (10a) of the expansion valve (10) which uses the digital signals received from the main control circuit (22b). Referring now to FIGS. 10 through 13, operations of the control circuit (22) are described below. FIG. 10 shows the difference in temperature δH at the inlet and outlet of the heat collector (11) detected by the first and second temperature detectors when the decompression amount of the expansion valve (10) varies while applying the heat-pump cycle (12) shown in FIG. 4, in which the drive capacity of the compressor (8) is variable when a specific evaporation capacity is present in order that result A1 can be produced when the drive capacity is negligible, result A2 can be produced when the drive capacity is moderately available, and result A3 can be produced when the drive capacity is sufficiently available. FIG. 10 indicates that, if the decomposition amount is insufficiently available, regardless of the drive capacity, a greater amount of thermal media than the evaporation capacity of the heat collector (11) will circulate, and then the thermal media cannot be fully evaporated in the heat collector (11). This will cause the thermal media to flow into the compressor (8) in the state partly bearing the liquid phase. During this stage, due to the lowered pressure in the tube connected to the first and second temperature detectors (23) and (24), the temperature of the thermal media lowers, whereas the difference of temperature δH becomes the negative δH against the optimum difference value HO, and it remains constant until a specific level of decompression is reached. Also, as the drive capacity of compressor (8) decreases, the amount of decompression decreases, too. As a result, the difference of temperature δH in the negative phase nears to zero. Conversely, when accelerating the decompression, the amount of thermal media under circulation gradually decreases, thus causing an optimum amount of decompression to be generated by precisely equilibrating the freezing capacity inherent to the thermal media and the evaporation capacity of the heat collector (11). Accordingly, the desired value ΔH of the temperature difference can be established within the practically allowable range centering the difference of temperature δHO when the amount of decompression is optimum. On the other hand, the desired value of the difference of temperature ΔH is established in the main control circuit (22b) in order that the function of Q proportional to the capacity data of the compressor (8) delivered to the main control circuit (22b) from the compressor capacity control circuit (20), as the primary function for example, can approximate the optimum temperature difference δHO. Therefore, the amount of decompression can be adjusted so that the difference of temperature δH detected by the first and second temperature detectors can correctly match the aimed value ΔH of the difference of temperature which is to be determined by the drive capacity of the compressor (8). To achieve this, the following process has been introduced. First, the control circuit (22) divides the aimed value ΔH of the temperature difference and the difference δH (hereinafter called "deviation") of temperature to be detected into a plurality of zones. The control circuit (22) adjusts the decompression control signal for delivery to the driver (10a) of the expansion valve (10) so that the status of the transversal deviation can be held unchanged when the deviation transversely moves between these zones. The control circuit (22) also adjusts the decompression control signal for delivery to the driver (10a) of the expansion valve (10) to eliminate the deviation if it still remains in the same zone beyond a specific period of time, and as a result, the heat pump cycle (12) can always be held at the optimum condition. FIG. (11) shows the preferred embodiment related to the method of dividing deviation (δH − ΔH) into zones, where the deviation is represented in the longitudinal axis as the digitalized amount in the hexadecimal notation. The preferred embodiments shown in FIG. 11 (a) and (b) respectively cause these zones to be divided at such intervals equal to each other. However, for easier identification of these zones in the microcomputer programs, such intervals may not always be equal to each other, as shown in FIG. 11 (c). These zones may not be strictly symmetrical between the upper and lower parts against the line denoting "Deviation (δH−ΔH)=0". Referring now to the preferred embodiment shown in FIG. 11 (c), operations of the control circuit (22) related to the method of dividing deviation into zones are described below.

Figure 12:
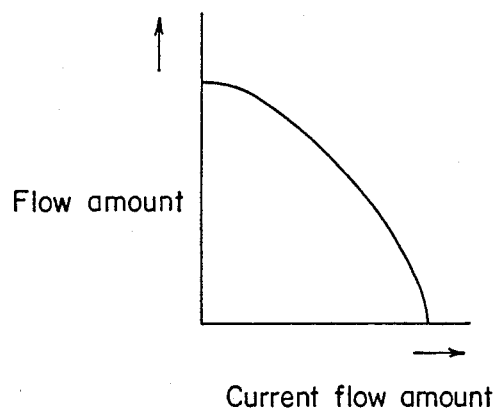
FIG. 12 is the line chart showing the relationship between the conductive amount of current delivered to the expansion valve driver and the flow amount of the heating media.
Figure 13:
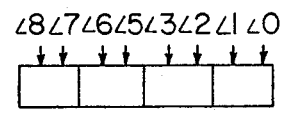
FIG. 13 is the chart showing the relationship between the 4-bit memory and the deviation zone.

In this case, as shown in FIG. 12, the expansion valve (10) normally remains closed. When gradually raising an output voltage which is substantially the decompression control signal against the driver (10a), the sectional area of the thermal media path decreases, and conversely, the decompression amount increases. For example, when performing a control operation corresponding to the proportional control using a linear control circuit, if the detected deviation was identified in zone L1 in the last step and in zone L2 while performing the heat pump cycle, even though there is an excessive flow of thermal media, the flow from the heat collector (11) tends to decrease. To restrain this tendency, a variable amount of current (ΔV2) flowing into the driver (10a) of the expansion valve (10) is subtracted from the actual current flow amount V to determine the correct current amount (VA) before delivery to the expansion valve (10) so that $VA = V - \Delta V2$. When the deviation detected in the next step is present in zone L3, the amount of current flow VA is adjusted so that VA equals to $V - \Delta V3$, thus causing the decompression amount of the expansion valve (10) to decrease. Conversely, when the deviation moves from zone L8 to zone L0, the amount of current flow VA is adjusted so that VA equals to $V - \Delta Vn$, causing the decompression amount of the expansion value to increase, constraining any variation of the deviation. In this case, the value of ΔVn may be variable between each zone, or it may be set at the same value even when the deviation moves between any of these zones transversely. If the detected deviation moves to zone L4 for example from zone L1 directly, taking the distance into account, it is necessary to also adjust the amount of current flow VA according to the equation shown below.

$$VA = V - (\Delta V2 + \Delta V3 + \Delta V4)$$

Next, the control means corresponding to the integration control conventionally applied to a linear control circuit is described below.

In the preferred embodiment shown in FIG. 11 (c), if the deviation is present in zone L4, it is determined that no deviation is present to allow the amount of current flow to remain unchanged. If the deviation is present in any of zones L0 through L3, since the deviation is in the negative phase, the expansion valve 10 doesn't sufficiently reduce the pressure, it is necessary to increase the amount of current flow so that the decompression amount can be increased. Conversely, if the deviation is present is any of zones L5 through L8, it is necessary to decrease the amount of current flow. There are two kinds of control method. The first one causes the amount of current flow to vary when the deviation still remains in the same zone beyond a specific period of time. The other applies a substantial "weight" to such zones that are apart from zone L4 to cause the control circuit to compute such "weight" based on the history of such zones in which the deviation was present for a specific period of time, and then applying this value, the control circuit causes the amount of current flow to vary itself at specific intervals. When applying the first method, if the deviation still remains in zone L1 for a specific period of time, the control circuit (22) executes such an operation so that the renewed amount of current flow equals the sum of the former amount of current V and ΔV1. If the deviation still remains in zone L8, operation is executed so that the renewed amount of current flow VA equals $V - \Delta V8$. If the deviation remains in any of zones L0 through L3, the renewed amount of current flow VA equals the sum of V and ΔVn. Conversely, if the deviation remains in any of zones L5 through L8, the renewed amount of current flow VA equals $V - \Delta Vn$. On the other hand, the variable amount ΔVn becomes greater in each zone as the deviation leaves zone L4. The second method provides surveillance for a specific period of time against such zones where the deviation is still present. For example, it provides the 4-bit memory M. The control circuit (22) computes the deviation at such intervals (5 seconds for example) that can quickly deal with any variation of the condition of the heat pump cycle, and then in response to such a zone where the diviation was present, digit 1 is set, which corresponds to the designated bit number of the 4-bit memory M shown in FIG. 13. After a specific period of time is past, the variable amount of current flow $\Delta Vn$ (see Table 1 that follows) determined by the bit pattern of the 4-bit memory M is added to the operation program so that the renewed amount of current flow VA equals the sum of the former amount of current flow V and $\Delta Vn$. This provides the control system with highly integrated control operations by applying such simple and short programs.

TABLE 1

| | M | $\Delta Vn$ |
|---|---|---|
| 0 | 0000 | 0 |
| 1 | 0001 | $4\Delta V$ |
| 2 | 0010 | $3\Delta V$ |
| 3 | 0011 | $2\Delta V$ |
| 4 | 0100 | $-3\Delta V$ |
| 5 | 0101 | $2\Delta V$ |
| 6 | 0110 | 0 |
| 7 | 0111 | $2\Delta V$ |
| 8 | 1000 | $-4\Delta V$ |
| 9 | 1001 | 0 |
| A | 1010 | $-2\Delta V$ |
| B | 1011 | $2\Delta V$ |
| C | 1100 | $-3\Delta V$ |
| D | 1101 | $-2\Delta V$ |
| E | 1110 | $-2\Delta V$ |
| F | 1111 | 0 |

Figure 14:
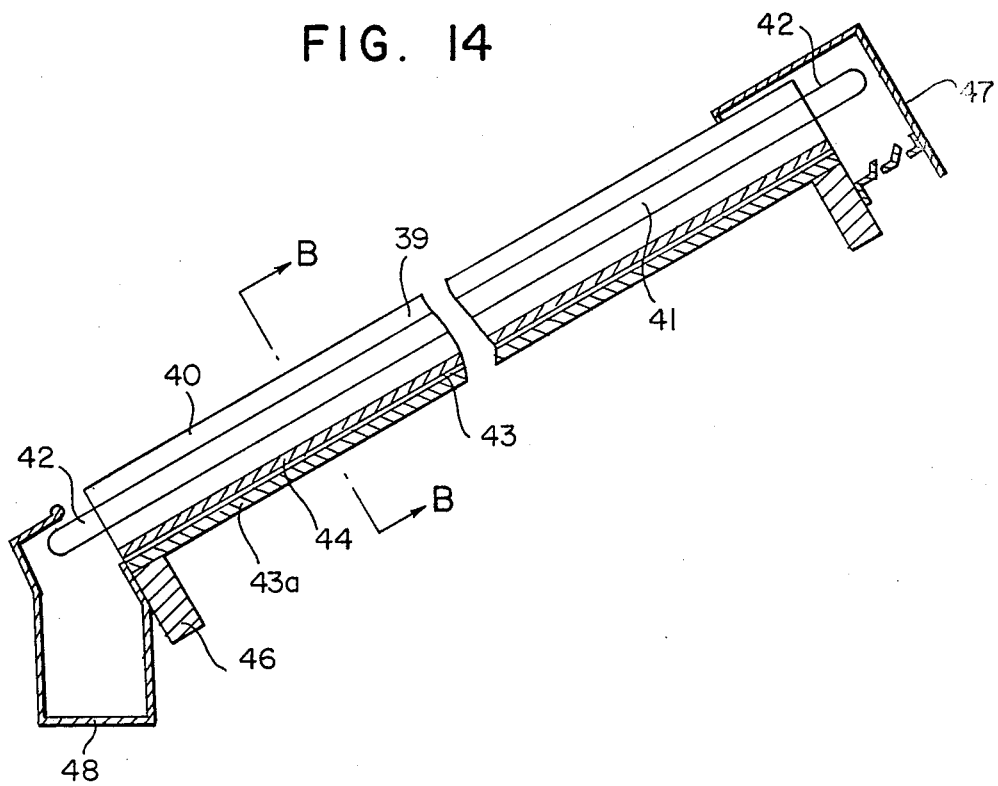
FIG. 14 is the sectional view of another preferred embodiment of the present invention related to the heat collector.
Figure 15:
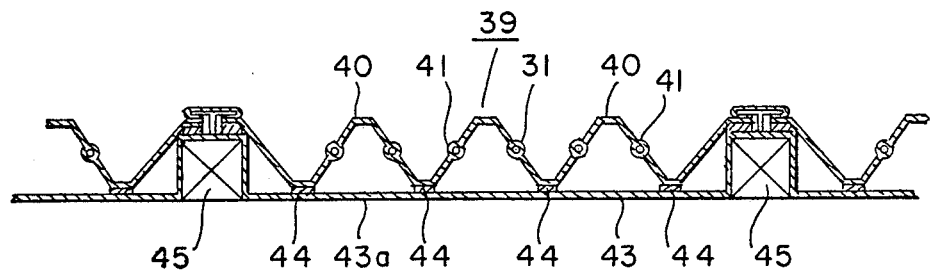
FIG. 15 is the sectional view of the heat collector taken on line B—B of FIG. 14.
Figure 16:
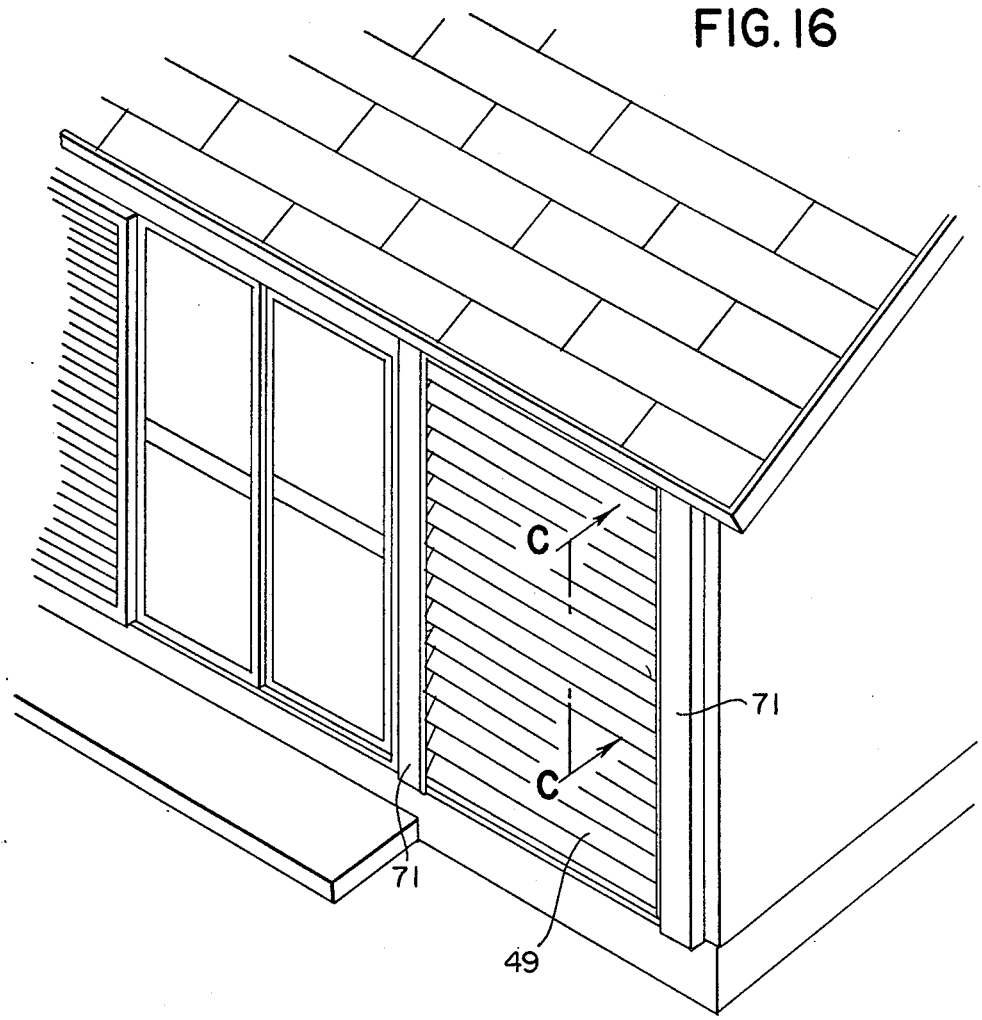
FIG. 16 is a perspective view of the installed heat collector reflecting another preferred embodiment of the present invention.

Another preferred embodiment of the present invention is described below. FIG. 14 is the sectional view of another preferred embodiment of the heat collector integrated with the roof of a house. FIG. 15 is the sectional view taken on line B—B of FIG. 14. Different from the, heat collectors shown in FIGS. 5 through 7, this heat collector as another preferred embodiment is an example of one of the vertically-mounted roof-integrated heat collectors in which thermal media tubes (41) are installed parallel to the roof gradient. Reference number 39 indicates a solar heat collector unit comprised of a zigzag-shaped fin unit 40 and a number of thermal media tubes formed in the middle part of the fin unit (40). These thermal media tubes (41) are respectively connected at their terminals to such thermal media tubes (41) which are coupled to the U-shaped connector tubes (42), thus forming a snaky path and concurrently functioning as the evaporator when the heat pump cycle operation is underway. The solar heat collector unit (39) is installed to the dew receiver sheet (43) located on the external sheet (43a) via an insulator member (44) made of synthetic rubber such as "Neoprene", thus concurrently functioning as the roofing material. Reference number 45 indicates the roof-rod, 46 the nose-concealler, 47 the roof-peak protector and 48, a tub, respectively. Compared to the case of installing such a heat collector (25) split into a number of units as shown in FIGS. 5 through 7, the solar heat collector (39) introduced above can be installed very easily because of its advantageous sheet form. Since it can be integrated into the housing structure, it can be effectively applied not only to the roof, but also to a variety of locations, such as the external wall, or the handrail of a balcony, veranda, or fence, etc. To begin with, one of the preferred embodiments of the heat collector integrally secured to the external wall is described below. FIG. 16 is the perspective view of this embodiment, and FIG. 17 is the sectional view of this embodiment taken on line C—C of FIG. 16. The solar heat collector (49) that concurrently functions as the evaporator shown, in FIGS. 16 and 17, is installed onto the surface of the external wall of a house building, thus it also makes up part of the wall material. Although not shown in the drawings, the solar heat collector (49) makes up heatpump cycles by performing the role of evaporator together with the compressor, condensor, and the expansion valve, while the heat collector (49) itself is made of thermally conductive material such as aluminum or copper, the external surface of which is finished with either dark color coating or colored aluminum oxide featuring durable weatherability, thus effectively promoting absorption of sunbeams.

As described earlier, the solar heat collector unit (49) embodied by the present invention effectively collects heat from air even when the surface temperature is cooled below the atmospheric temperature. Due to the relationship between the temperature on the surface of the heat collector sheet and the atmospheric humidity, dew will be generated all over the surface of the heat collector (49). When a substantial amount of dew is generated, dew water flows down. Unlike such conventional metal-made wall materials having the up-bent juncture, the heat collector (49) which is integrally secured to the external wall dispenses with such a up-bent juncture, thus allowing dew water to flow down smoothly uninterrupted. In FIG. 16, reference number (71) indicates a cover that conceals the tube juncture of the heat collector (49).

FIG. 17 is a sectional view of another preferred embodiment, in which no auxiliary fin is provided for the surface of the heat collector (49), and therefore, the heat collector (49) comprises a flat heat collector (50a) and thermal media tubes (51). Since no auxiliary fin is provided, the heat collection capacity from atmospheric air lowers slightly. However, since the juncture (70) between each heat collector is provided at the tip portion of the bent part (74) in the bottom end of the heat collector fin, all junctures (70) are invisible externally. FIG. 18 is also a sectional view of the heat collector (49) with the auxiliary fin deleted, in which only a piece of thermal media tube (51) is provided for the heat collector (49).

Next, typical examples of the preferred embodiments of the present invention incorporating heat collectors into the house configuration, as the fence components of a balcony for example, are described below.

Figure 19:
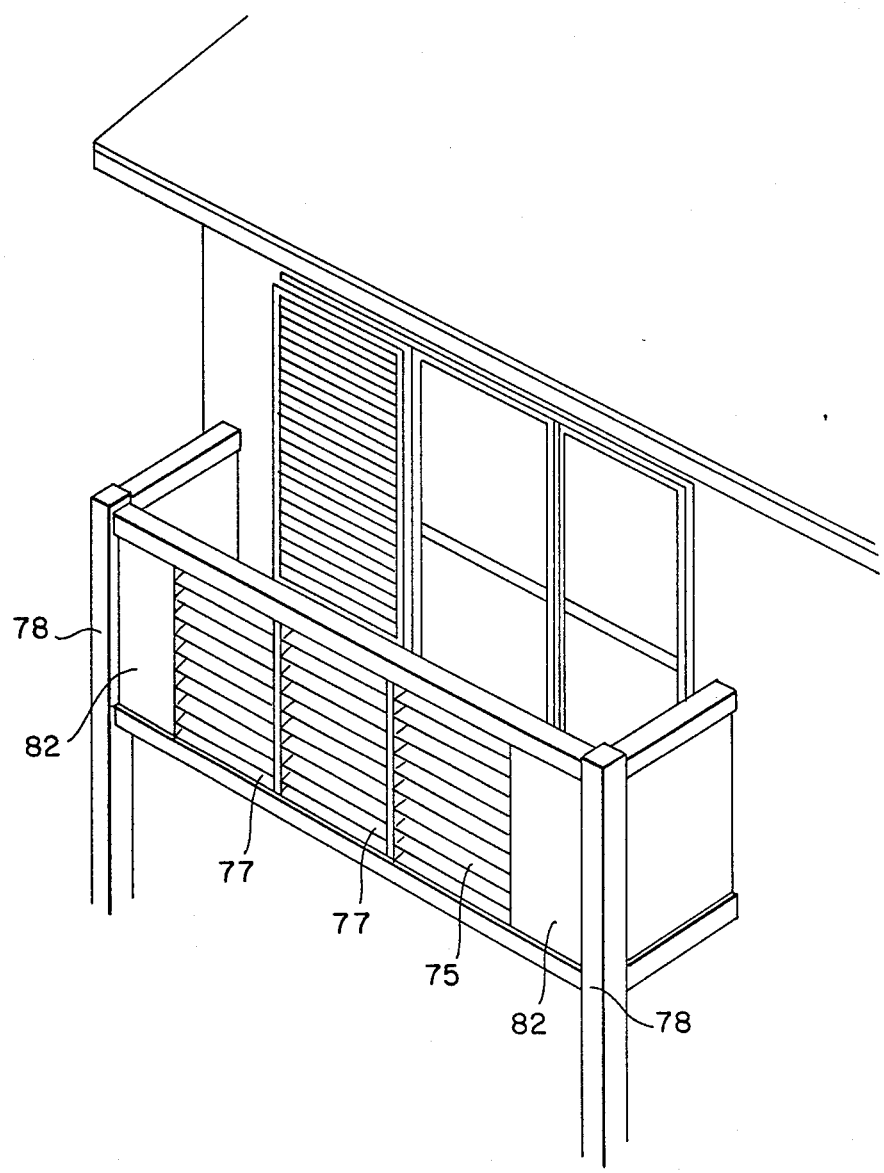
FIG. 19 is a perspective view of a still further preferred embodiment of the heat collector reflecting the present invention.
Figure 20:
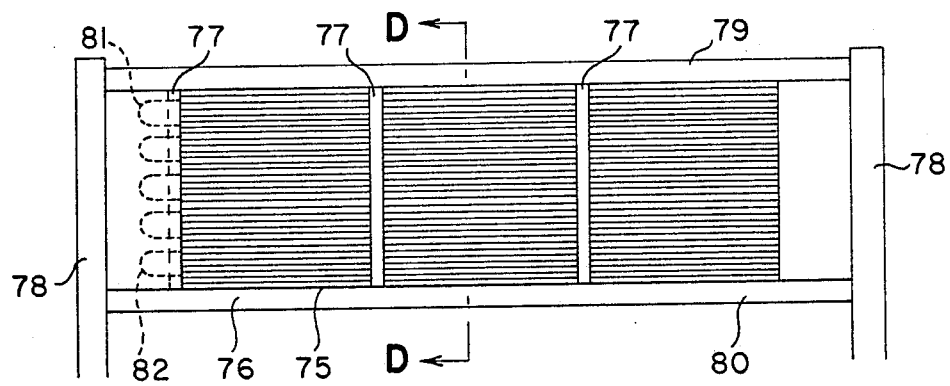
FIG. 20 is the front view of the heat collector shown in FIG. 19.
Figure 21:
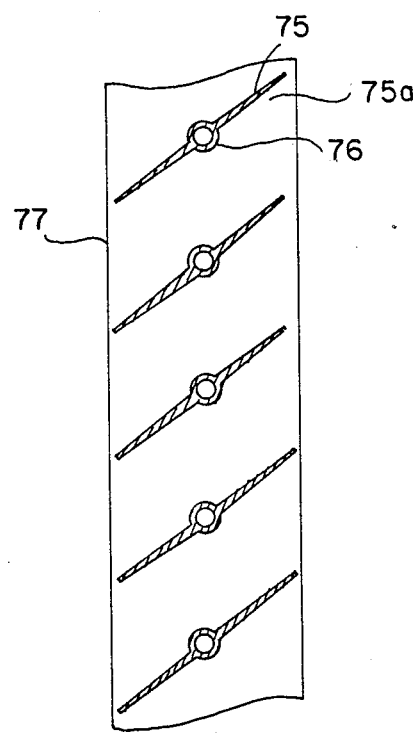
FIG. 21 is the sectional view of the heat collector taken on line D—D of FIG. 20.
Figure 22:
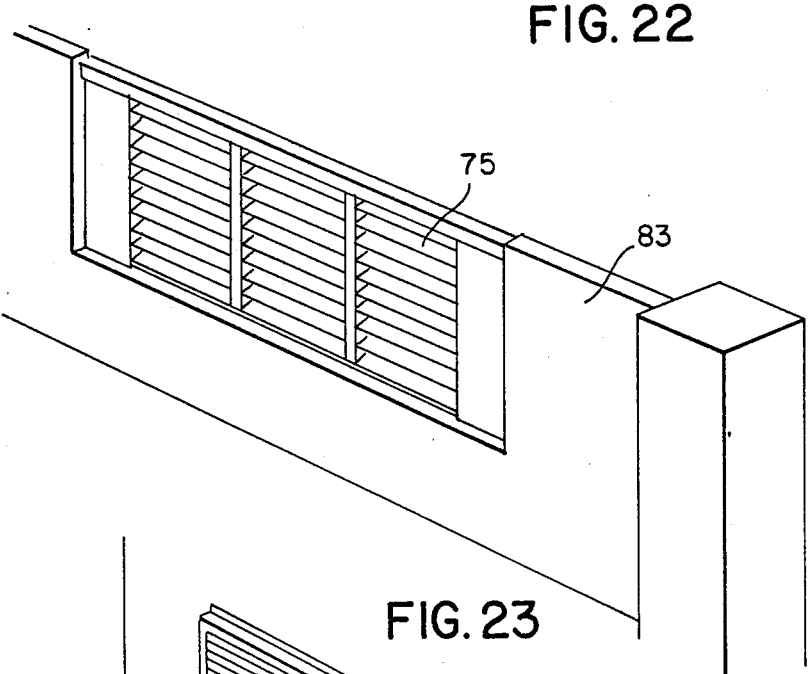
FIG. 22 is a perspective view of a still further preferred embodiment of the heat collector reflecting the present invention.
Figure 23:
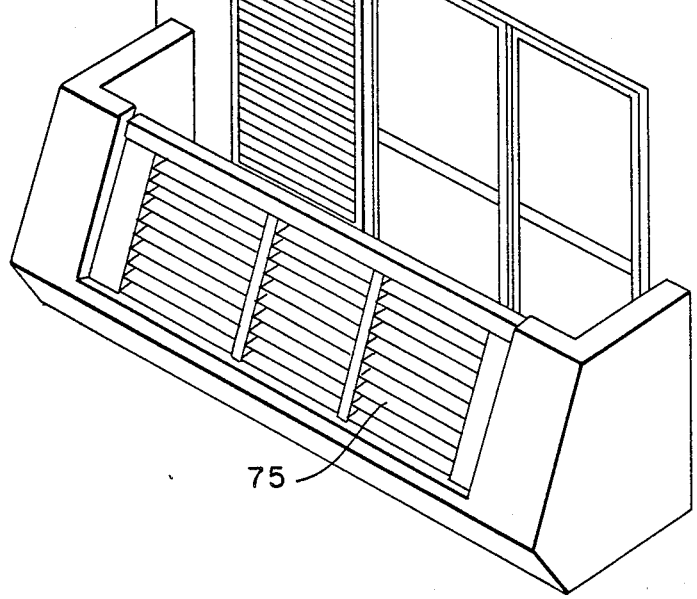
FIG. 23 is a perspective view of a still further preferred embodiment of the heat collector reflecting the present invention.
Figure 25:
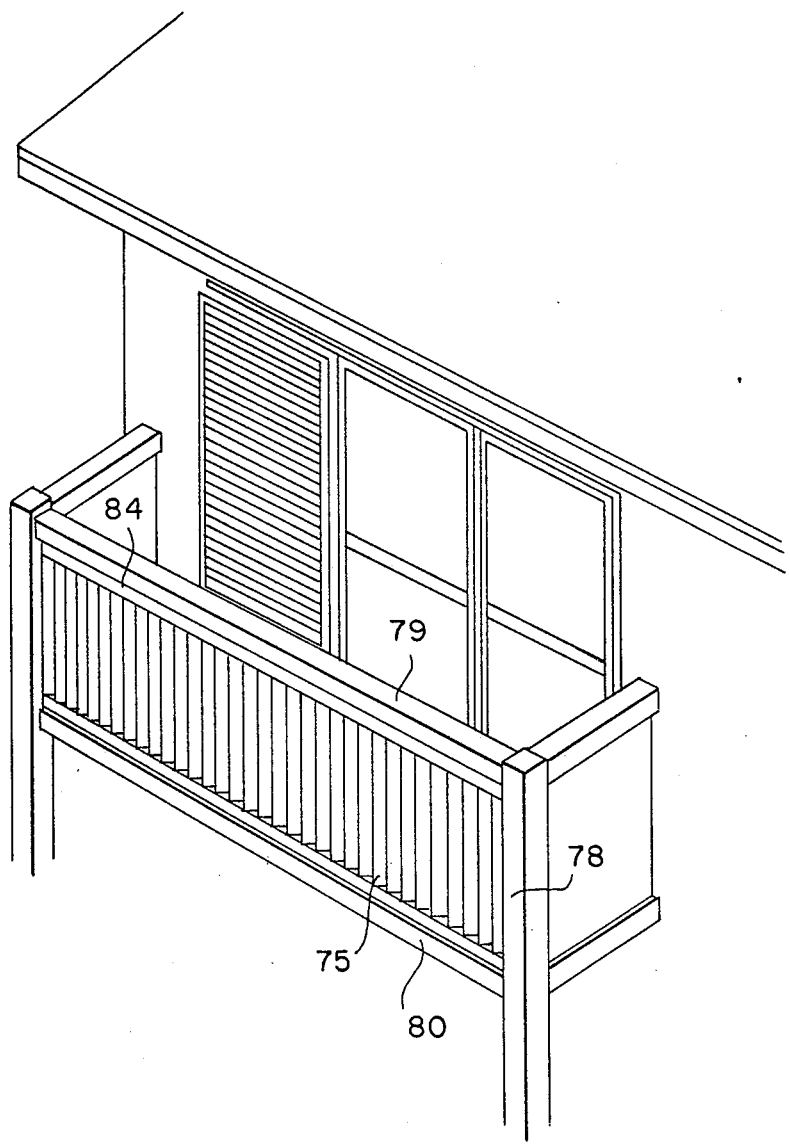
FIG. 25 is a perspective view of a still further preferred embodiment of the present invention.
Figure 26:
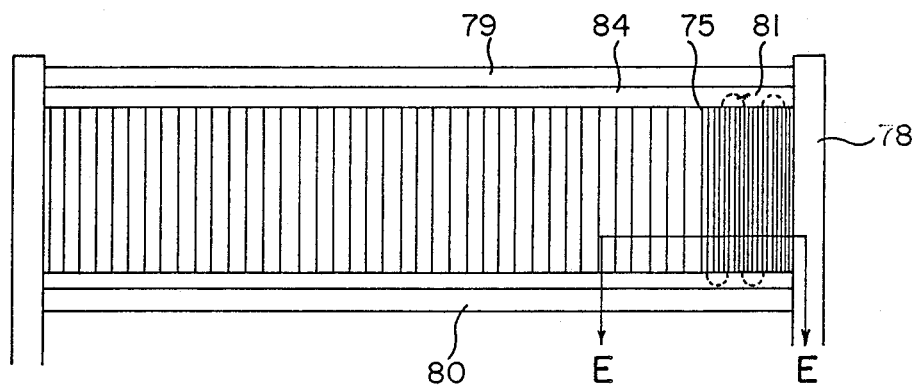
FIG. 26 is the sectional view of the heat collector reflecting a still further preferred embodiment of the present invention.
Figure 27A:
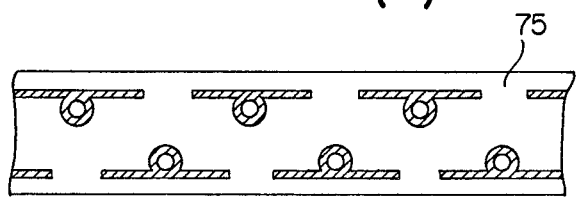
FIG. 27 (a) and (b) are the sectional views of the heat collector reflecting a still further preferred embodiment of the present invention.
Figure 27B:
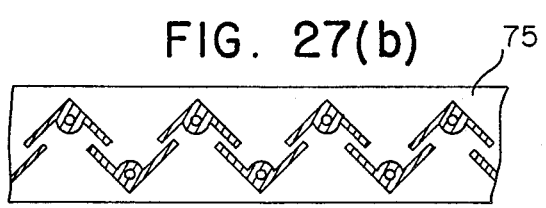

FIG. 19 is the perspective view of the preferred embodiment related to the balcony configuration. FIG. 20 denotes its front view, while FIG. 21 is the sectional view taken on line D—D of FIG. 24. In FIGS. 19, 20, and 21, reference number 75 indicates the solar heat collector that concurrently functions as the evaporator as well as the lattice of the balcony fence. Although not shown in the drawings, the solar heat collector (75) acting as the evaporator makes up the heat pump cycles together with the compressor, condensor, and the expansion valve. The heat collector unit (75) is comprised of a sheet-shaped fin (75a) made of thermally conductive materials such as either aluminum or copper and the thermal media tube (76) integrated with the sheet-shaped fin (75a) in the center of fin (75a). The external surface of the that collector (75) is finished with either a dark colored coating or colored aluminum oxide featuring durable weatherability, thus ensuring satisfactory absorption of heat from sunbeams. As shown in FIG. 25, a plurality of heat collectors (75) are installed in the upper and lower positions with a specific gradient, whereas both ends and the center of the heat collector (75) are secured to the support column (77) installed at specific intervals. The entire configuration serves as the fence or the lattice of a balcony. FIGS. 19 through 21 respectively show such a case in which the collector (75) has been integrally built with the balcony. Reference number 78 indicates the column of the balcony, 79 the upper frame, and 80 the bottom frame, respectively. Some space is provided on both ends of the heat collector (75) for storing tubes such as the U-shaped tube (81) connected to the thermal media tubes of each heat collector (75). Reference number 82 indicates a cover that conceals the tube assembly. The solar heat collector (75) integrated with the balcony should preferably be installed facing south so that it can sufficiently absorb heat from sunbeams and effectively collect atmospheric heat through the well ventilated configuration. FIG. 22 shows another preferred embodiment, in which the heat collector has been integrally built with a fence bordering sites. Although not shown in the drawings, it is also possible to install the heat collector (75) integrally with the handrails of a veranda or flat top roof. FIG. 23 shows another preferred embodiment of the heat collector (75) integrated with a balcony structure, in which the front surface of the balcony is provided with a specific gradient so that a greater amount of heat can be collected from sunbeams than is obtainable from a vertical surface. FIG. 24 shows a still further embodiment of heat collector (75) whose sectional view is shown in FIG. 21. The surface area of the heat collector fin can be expanded by providing the fin with a fold line (b) and also by adding a small fin (c) to the bottom part of the heat collector (75), thus promoting the capacity for collecting heat from the atmosphere (see FIG. 24 (a), (b), and (d) as well). FIG. 24 (e) shows such a case in which the heat collector fin is vertically installed so that the upper and lower fins can be coupled to each other, and, in addition, the third fin (d) provided with a phone angle is set to the external surface of the balcony. This effectively prevents children from climbing over the balcony by treading on the heat collector. FIG. 25 is the perspective view of a still further preferred embodiment of heat collector integral with the balcony, while FIG. 26 shows its front view. In this embodiment, the heat collector (75) is vertically installed so that it can be integrated with the lattice of the balcony, thus eliminating any concern about children climbing over. As shown in FIG. 26, when the heat collector (75) is vertically installed, the U-shaped tubes are also vertically provided. Reference number 84 indicates the cover concealing the tube assembly. The cover (84) can be omitted by means of arranging the tubes inside the upper and lower support frames (79) and (80). In reference to the configuration of the sectional view taken on line E—E of FIG. 26, as in the case of the horizontal arrangement, it is also possible to embody such configuration shown in either FIG. 21 or FIG. 24 (a), (b), and (d). FIG. 27 (a) and (b) respectively show still further preferred embodiments of the sectional view taken on line E—E of FIG. 26, in which a number of heat collectors are aligned in zigzag formation in two arrays opposite to each other. If these were aligned vertically, as shown in the E—E sectional configuration of FIG. 21 and/or FIG. 24 (a) and (b), due to the variable incident angle of sunbeams during the day, a relatively large amount of sunbeams would pass through the heat collector (75) during a specific period of time. Conversely, by employing those which are provided with a sectional configuration identical to those shown in FIG. 24 (d) or FIG. 27 (a) and (b), wasted sunbeams can be either minimized or totally eliminated without allowing them to pass through the heat collector (75).

Next, still further preferred embodiments related to the method of controlling the capacity of the compressor (8) employed for the solar heat collector system are described below. One of these preferred embodiments comprises the following. Referring back to FIG. 4, the first temperature detector (17) is provided at the inlet of the fluid heater (15) and the second temperature detector (18) at the outlet of the same fluid heater (15). In addition, a plurality of third temperature detectors (21) are provided for detecting the fluid temperature of the hot-water pool (13) at the time of starting the heat collection operation. The control circuit (19) that controls the capacity of the compressor (8) by means of signals from these first, second and third temperature detectors 17, 18, and 21, is provided. This control circuit (19) detects the fluid temperature of the hot-water pool (13) at the time of starting the heat collect operation based on the signal from the third temperature detectors (21); it then computes the desired heating capacity in reference to the difference between the detected temperature and the desired heating temperature and also in conjunction with the heat collect operation from the start-up time to the desired time at which the expected temperature is reached, while the control circuit (19) also computes the heating capacity of the heat collector circuit (12) in reference to the temperature detected by the first and second temperature detectors (17) and (18), and finally outputs the capacity control signal to the compressor (8) so that the heating capacity can correctly reach the aimed heating capacity. The desired heating capacity is determined by the following process. The aimed heating capacity is computed based on the heating load requirements that are determined in reference to the "difference" between water temperature stored in the hot-water pool (13) at the start-up of the heat collect operation and the storage capacity of the pool (13) and the "actual heat collecting time" that denotes the difference between the start-up time and the time at which the aimed temperature can be reached.

| Heating load = | (aimed heating temperature - water temperature of the pool (13) at the start-up of the heat collecting operation) |
|---|---|
| Aimed heating capacity = | Heating load/Heat-collect operation time |

Figure 28:
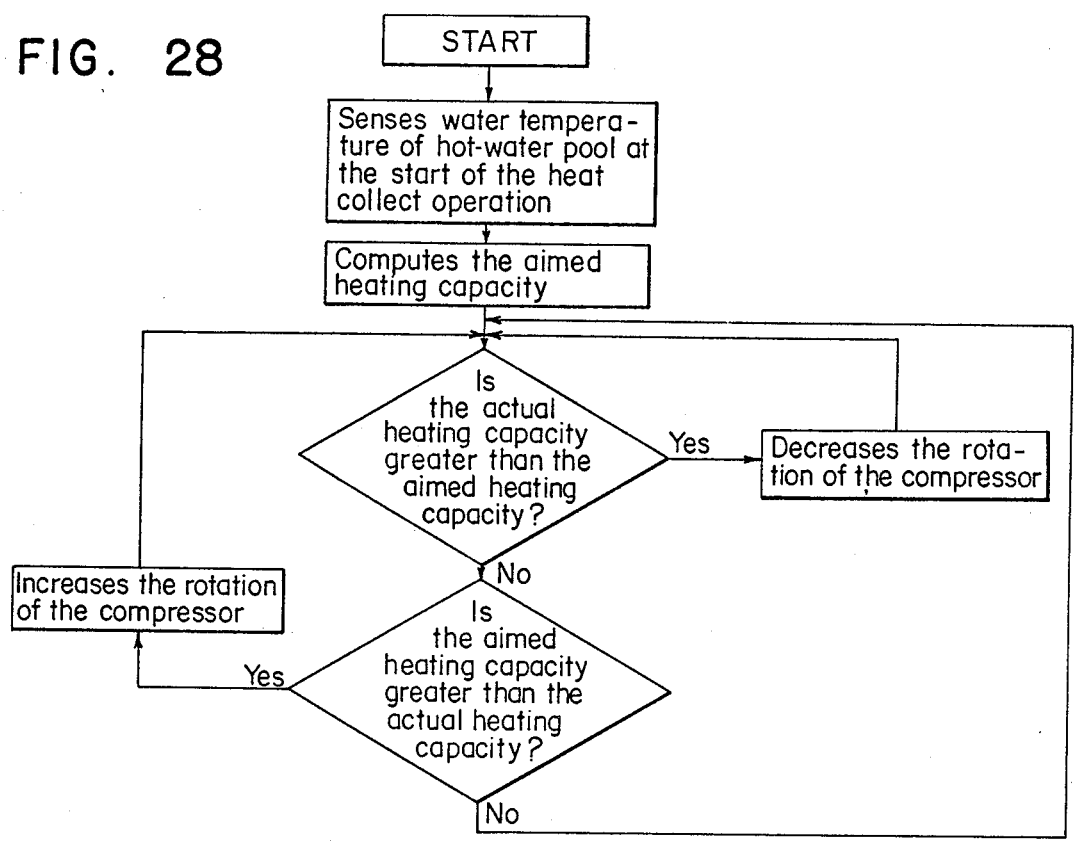
FIGS. 28, 29, and 30 are respectively the flowcharts describing the procedure needed for controlling the capacity of the compressor reflecting still further preferred embodiments of the present invention.

FIG. 28 shows the control flowchart describing procedures for implementing the above control operations. A still further embodiment employing simplified procedures is described below.

Figure 29:
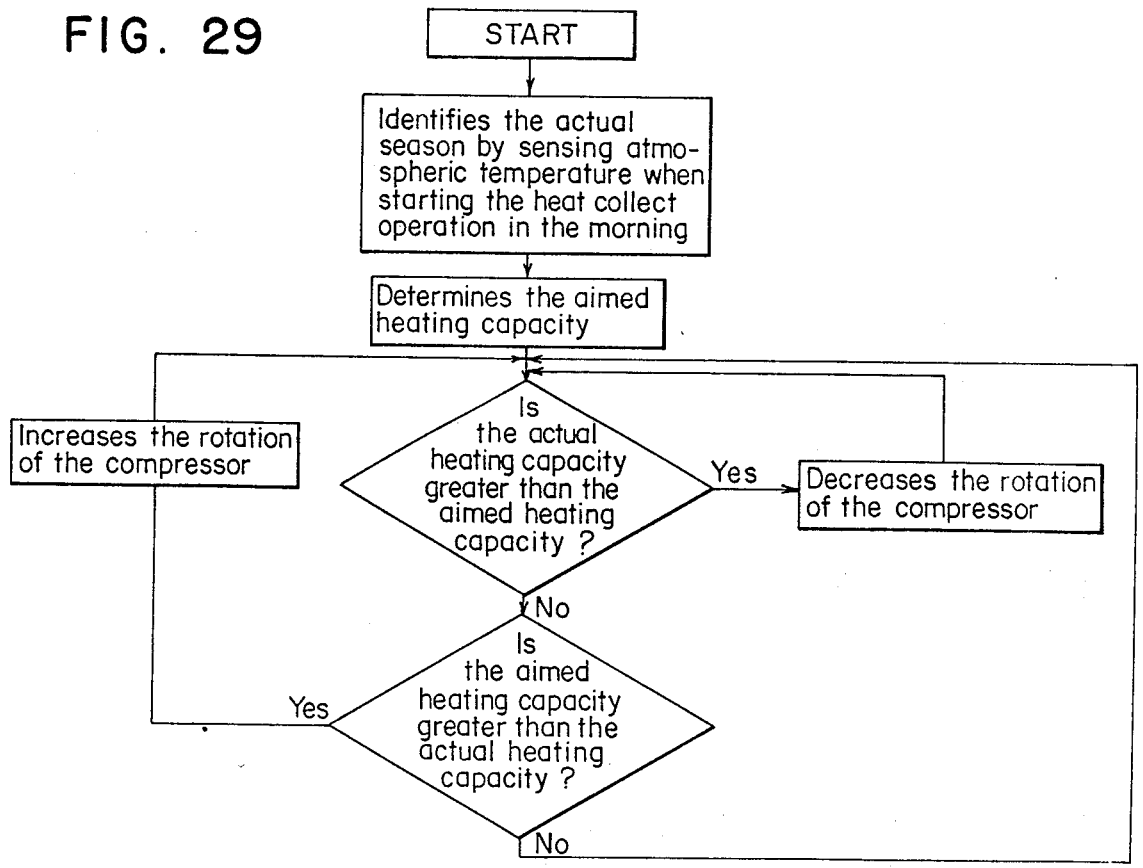

This embodiment provides the atmospheric temperature detector (not shown) in place of the third temperature detector that detects water temperature in the hot-water pool to implement the preferred embodiment mentioned above. The atmospheric temperature detector detects atmospheric temperature at a specific time in the morning to deliver this data to the control circuit (19), which then identifies the season using this atmospheric temperature data before eventually determining the variable objective heating capacity. Note that the capacity of the compressor (8) is controlled by the same method described for the foregoing preferred embodiment. The control flowchart is shown in FIG. 29. The aimed heating capacity can also be determined by such means other than those which were described earlier. Instead of the atmospheric temperature detector (21), the replenished water temperature detector (85) is provided for the water tap (13a) of the hot-water pool (13). Using this temperature detector (85), the temperature of water supplied from the tap (13a) into the pool (13) on the previous day was sensed for identifying the actual season in advance.

Figure 30:
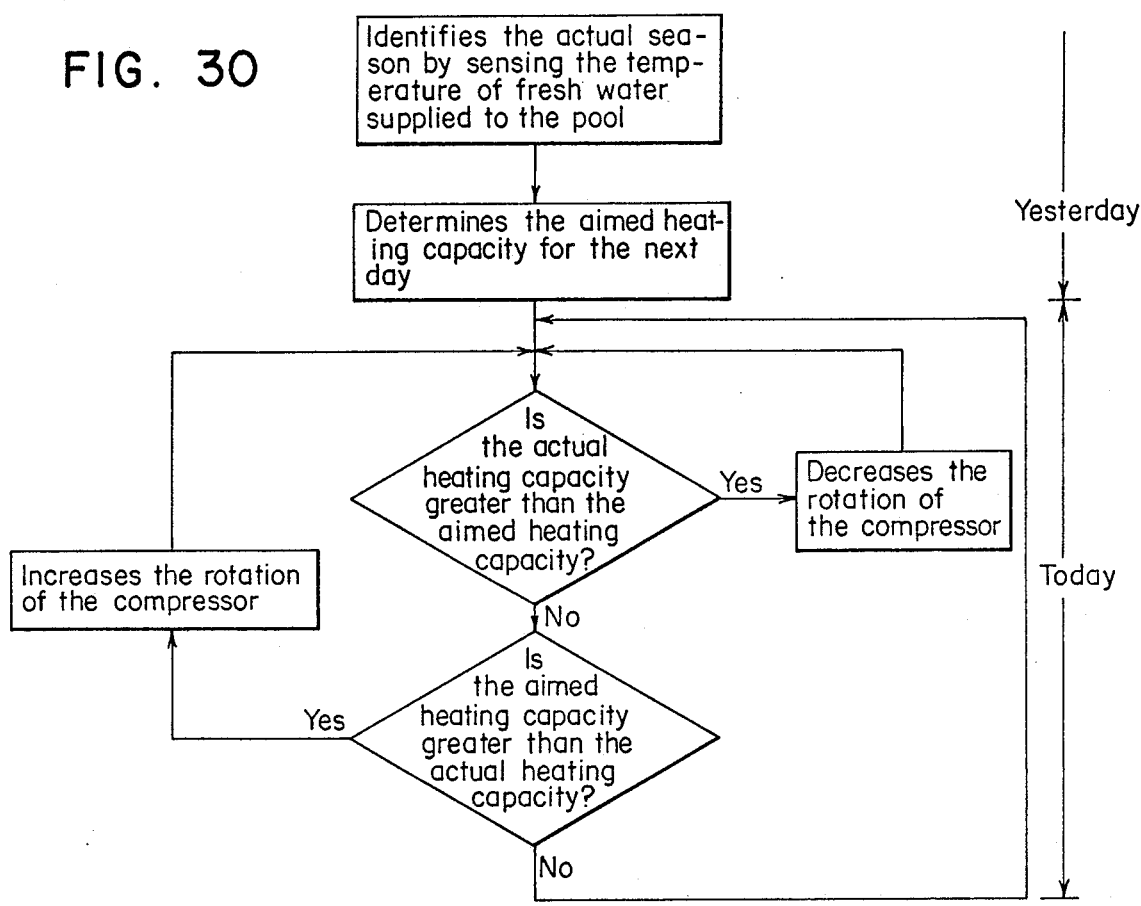
Figure 31:
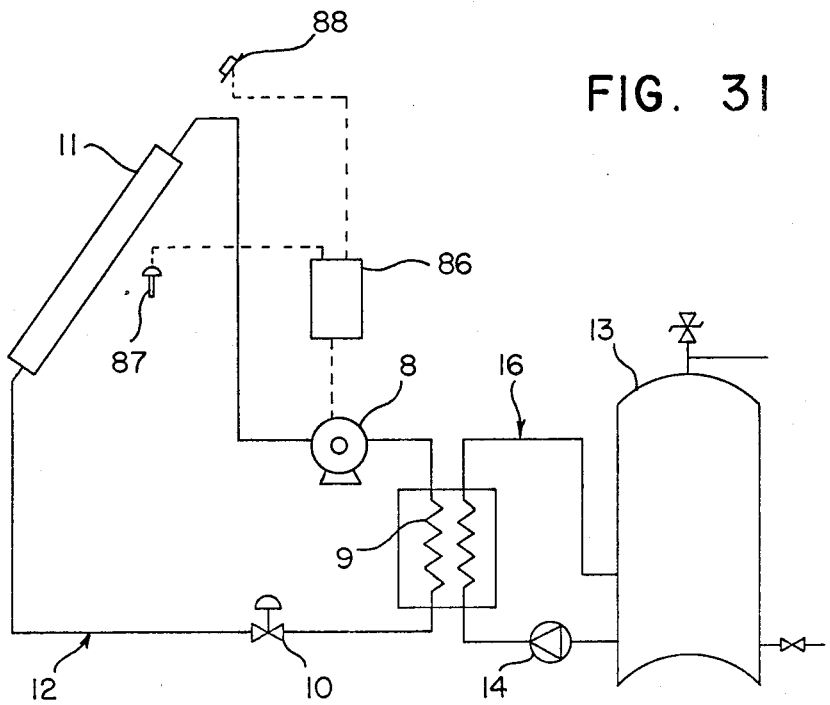
FIG. 31 is the configuration of a still further preferred embodiment of the collector reflecting the present invention.

This enables the controller to automatically determine the aimed heating capacity before starting today's heat collection operation. FIG. 30 shows the flowchart needed for implementing the operation just mentioned. As a still further preferred embodiment related to means for properly controlling the capacity of the compressor, a typical example of controlling the capacity by means of sensing the atmospheric temperature and the amount of receivable sunbeams is introduced below. FIG. 31 shows the schematic diagram of this preferred embodiment, in which the capacity of the compressor (8) is variable. The controller (86) controls the capacity of the compressor (8) by means of sensing the atmospheric temperature and the amount of receivable sunbeams, while the controller (86) reduces the rotation of the compressor (8) when the atmospheric temperature is higher and/or a large amount of sunbeams is available, and conversely, when the atmospheric temperature is low and the receivable amount of sunbeams is insufficient, the controller (86) raises the rotation of the compressor (8).

According to the mechanism described above, the controller (86) effectively functions so that the solar heat collector system embodied by the present invention can ensure an optimum heat collect capacity precisely matching the water load requirements throughout the year. For example, during winter when a greater heating load is required for supplying hot water, the controller (86) causes the compressor (8) to raise the operative frequencies so that the heat collect capacity can be strengthened. Conversely, it causes the compressor (8) to lower the operative frequencies as well as its rotation during summer when the hot-water load is not always required, thus making it possible to reduce input against the compressor (8). Normally, depending on the amount of sunbeams radiated, the heat collect capacity is variable in daily operations. To compensate for this, the controller (86) causes the compressor (8) to slightly raise the operative frequencies when sunbeams are insufficiently available on cloudy or rainy days, while lowering the evaporation temperature of the heat collector in order to strengthen the capacity for collecting heat form the atmosphere.

Figure 32:
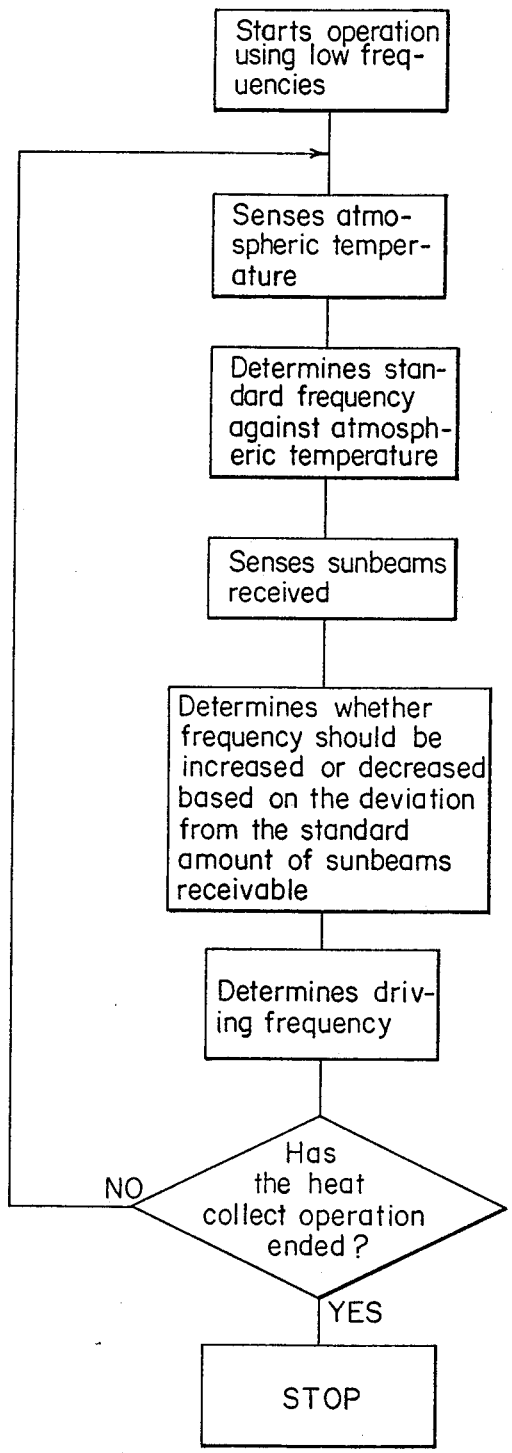
FIG. 32 is the flowchart describing the procedure needed for controlling the capacity of the compressor.

Conversely, the controller causes the compressor (8) to lower its operative frequencies during fine days when a large amount of sunbeams can be received, thus lowering the heat collect capacity from the atmosphere by minimizing input against the compressor (8) so that heat can be received from sunbeam alone. Referring to FIG. 31, reference number 86 indicates the control circuit which is provided with the frequency converter, 87 the atmospheric temperature sensor, and 88 the sunbeam sensor, respectively. The number of rotations of the compressor (8) is controlled by the frequency converter, while the controller (86) adjusts the operative frequencies of the compressor (8) to the optimum level, i.e., to the optimum number of the rotation on receipt of signals from the atmospheric temperature sensor (87) and the sunbeam sensor (88). FIG. 32 shows the flowchart needed for properly controlling the operative frequencies. After the compressor (8) has been activated by the lowest frequency, on receipt of the atmospheric temperature data, the controller determines the standard operative frequency that correctly matches the atmospheric temperature before delivery to the compressor (8). For example, when the atmospheric temperature TO is equal to or higher than 30° C., the operative frequency is adjusted to 35 Hz. If the atmospheric temperature TO is higher than 25° C. and equal to or slightly lower than 30° C., then the operative frequency is adjusted to 46 Hz. If the atmospheric temperature TO is higher than 20° C. and equal to or slightly lower than 25° C., the operative frequency is adjusted to 57 Hz. If the atmospheric temperature TO is higher than 15° C. and equal to or slightly lower than 20° C., the operative frequency is adjusted to 68 Hz. If the atmospheric temperature TO is higher than 10° C. and equal to or slightly lower than 15° C., the operative frequency is adjusted to 79 Hz. If the atmospheric temperature TO is equal to or slightly lower than 10° C., then the operative frequency is adjusted to 90 Hz. Next, the sensor system detects the amount of sunbeams radiated. If the amount of sunbeams (I) is more than the normally receivable sunbeams represented as $Io=250 Kcal/m^2h$, the operative frequency is lowered.

Figure 33:
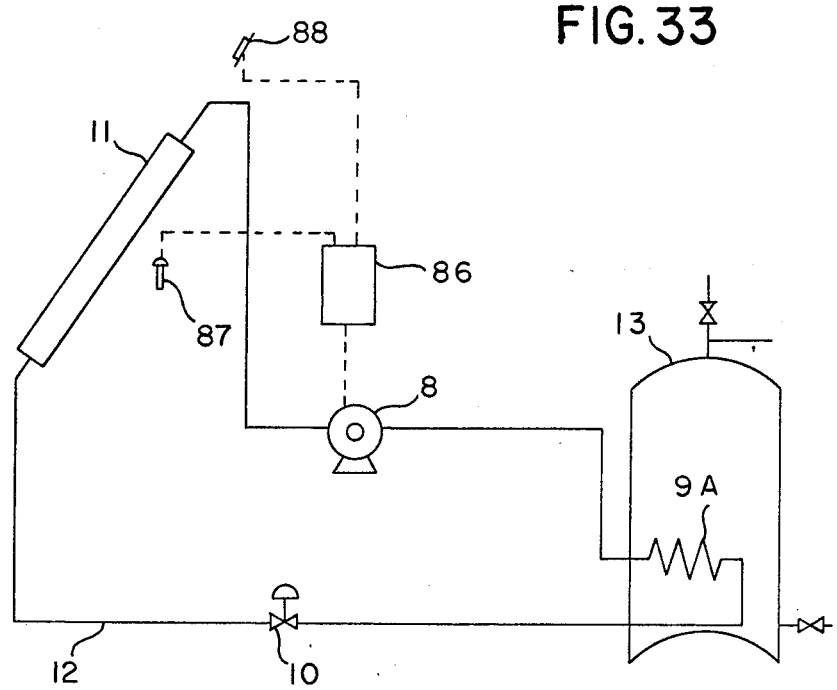
FIG. 33 is the configuration of a still further preferred embodiment of the heat collector reflecting the present invention.

Conversely, if the radiated sunbeams are less than $250-Kcal/m^2h$, the controller causes the operative frequency to rise for the compressor (8). For example, if the amount of radiates sunbeams is represented by a formula $Io+200 > I \geq Io+100 Kcal/m^2h$, th operative frequency is lowered by one step (corresponding to about 5.5 Hz), and if it is I $Io+200 Kcal/m^2h$, the operative frequency is lowered by two steps (about 11 Hz). Conversely, if it is $Io-200 < I \leq Io-100$, the operative frequency is raised by one step, and if it is $I \leq Io-200$, the operative frequency is raised by two steps. Needles to say, these operative frequencies are controlled within the allowable range, for example, from 30 Hz to a maximum of 90 Hz. Even if the heat collector system is internally provided with condensor 9A related to the heat pump cycle in the hot-water pool by deleting the fluid circulation circuit as shown in FIG. 33, the solar heat collector system reflecting this embodiment can still correctly control the operative temperature and frequencies as was done by the operation mechanism described above. As is clear form the foregoing description, the present invention provides a unique solar heat collector system, in which respective heat collector units are comprised of thermal media tubes allowing thermal media to pass through them and heat-collect fins connected to thermal media tubes for facilitating heat transfer, while these heat collectors are integrally built into conventional housing materials and fittings making up a house-building; and the compressor which, is one of the main constituents of the present heat collector system, effectively varies its own capacity by converting operative frequencies, wherein the solar heat collector system comprises: a compressor that compresses and outputs thermal media; a condensor connected to the output terminal of the compressor; a heat collector circuit whose one end is connected to the condensor via a squeezer and the other end to the compressor; a hot-water pool storing water for use in the house building; and fluid heating circuit comprised of a fluid heater held in the heat-exchange relationship with the condensor outside the hot-water pool and the condensor connected to the fluid heater.

Of these, each heat collector is ideally formed so that it can concurrently perform dual roles as with a heat collector and housing material. In contrast to a variety of conventional heat collectors, the solar heat collector system embodied by the present invention features unique and attractive designs integrally matching the housing materials and external fittings, thus making it possible to perfectly preserve the beautiful appearance of the house building itself. In addition, since the present heat collector system concurrently plays dual roles as the heat collector itself as well as part of the housing material, it effectively reduces the total cost conventionally needed for the housing and installation of th heat collect system, thus significantly promoting economy. In particular, the compressor employed for the preferred embodiments of the present in vention functions so that the heat control capacity can be properly controlled by converting the operative frequencies in response to the variable conditions of heating load and to conditions caused by seasonal factors. During the winter season, when a greater heating load is required but the heat-collect capacity is lower due to atmospheric conditions, the controller causes the compressor to raise the operative frequencies to strengthen the heat collect capacity. Conversely, during the summer season when the heating load can be greatly reduced and the heat collect capacity rises, the controller causes the compressor to lower its operative frequency level so that excessive heat collection can be prevented and the power consumption of the compressor can be lessened. Accordingly, the solar heat collector system embodied by the present invention features a unique heat collect capacity that can be adequately adjusted in response to the actual load requirements throughout the year, and, as a result, it dispenses with an auxiliary heating source even during winter when sufficient sunbeams cannot be received, thus providing an extremely high operative coefficient throughout th year. The expansion valve function as a squeezer unit is provided with a motor driver, which is controlled by the control circuit that first detects the difference in temperature at the inlet and outlet of the heat collector sensed by the first and second temperature detectors set to the inlet and outlet of the heat collector and then outputs control signals. The control circuit thus outputs control signals for controlling the decompression amount of the expansion valve so that the difference in temperature at the inlet and outlet of the heat collector can correctly match the aimed value designated by the capacity control signal sent from the capacity control circuit of the capacity-variable compressor.

Accordingly, in contrast to conventional mechanical automatic expansion valve and capillary tubes, the expansion valve employed for th preferred embodiments of the present invention effectively and quickly deal with any variation in heat collect conditions which are rapidly and widely variable when receiving sunbeams, and yet, since the expansion valve can be adequately controlled in conjunction with the capacity control signal from the capacity-controllable compressor, the entire heat pump cycles of the present solar heat collector system can be held constant under the optimum operative conditions.

The present invention thus described in detail may be modified variably in many ways by those who are skilled in arts. However, any of such modifications or variations shall in no ways be regarded a departure from the spirit and scope of th present invention, while all th modifications and variations shall be included within the scope of the following claims.

What is claimed is:

1. A solar heat collector system comprising:
a heat collector circuit and a fluid heating circuit, said heat collector circuit being in a heat exchange relationship with said fluid heating circuit;
said heat collector circuit including at least one heat collector, a compressor that compresses and outputs thermal media and which is provided with a variable capacity capability by conversion of its operative frequencies, a condenser and an expansion valve, said compressor being interposed between an output side of said at least one heat collector and input side of said condenser and said expansion valve being interposed between an output side of said condenser and input side of said at least one heat collector;
said fluid heating circuit comprising a hot water pool and a fluid heater, said fluid heater being held in a heat-exchange relationship with said condenser; and
control means for controlling said capacity of said compressor including first and second temperature detectors disposed respectively at input and output sides of said fluid heater and a third temperature detector disposed in said hot water pool, which control means adjusts the capacity of said compressor in accordance with said temperatures of said first, second and third temperature detectors.

2. Solar heat collector system comprising:
a heat collector circuit containing a compressor that compresses and outputs from an output portion thermal media and is capable of varying its own capacity by conversion of its operative frequencies; a condenser forming part of said heat collector circuit, connected to said output portion of said compressor; and a plurality of heat collector units integrally built as housing materials, an input end of which being connected to an output end of said condenser through an expansion valve and an output end of said heat collector connected to said compressor, wherein each heat collector unit contains a plurality of thermal media tubes allowing thermal media to pass therethrough and heat collector fins connected to said thermal media tubes for transferring heat;
a hot-water pool for storing hot water for use inside said system;
a fluid heating circuit inclusive of a fluid heater held in a heat-exchange relationship with said condenser outside of said hot-water pool;
first and second temperature detectors respectively set at inlet and outlet ends of said fluid heater and a third temperature detector sensing fluid temperature of said hot-water pool; and
a control circuit that controls the capacity of said compressor based on signals from said first, second, and third temperature detectors, said control circuit detecting the fluid temperature of said hot-water pool at the start of the heat-collecting operation based on signals from said third temperature detector, and computing the desired heating capacity based on the difference between said detected fluid temperature of said hot-water pool and a designated temperature to be reached, in reference to the heat-collecting operation time from the start of the operation up to the desired time at which said designated temperature is reached, and based on said temperatures detected by said first and second temperature detectors, and outputting a capacity control signal to said compressor so that said actual heating capacity matches said desired heating capacity.

3. Solar heat collector system comprising:

a heat collector circuit inclusive of a compressor that compresses and outputs thermal media, capable of having its heating capacity varied by conversion of its operative frequencies; a condenser connected to an output side of said compressor; a plurality of heat collector units integrally built as housing materials, an input end of which being connected to an output end of said condenser through an expansion valve and an output end of said heat collector connected to said compressor, wherein each heat collector unit contains a plurality of thermal media tubes allowing thermal media to pass therethrough and heat collector fins connected to said thermal media tubes for transferring heat;

a hot-water pool storing hot water for use inside said system;

a fluid heating circuit inclusive of a fluid heater that is held in a heat-exchange relationship with said condenser of said heat collector circuit outside of said hot-water pool;

first and second temperature detectors set to respective inlet and outlet ends of said fluid heater, and at least one third temperature detector provided for sensing temperature of said hot-water pool; and a control circuit for determining the desired heating capacity of said compressor in reference to a detected temperature of said hot-water pool based on signals from said at least one third temperature detector and a difference between said detected temperature and a predetermined temperature to be reached, computing said heating capacity of said compressor further with reference to a temperature difference between said first and second temperature detectors, outputting a capacity control signal to said compressor so that the actual heating capacity can match the desired heating capacity.

4. The solar heat collector system as in claim 3 further including:

an expansion valve provided with a motor driver;

separate temperature detectors respectively set to respective inlet and outlet ends of said plurality of heat collector units; and a control circuit for said expansion valve for controlling an open rate of said expansion valve in reference to signals from said separate temperature detectors set to said respective inlet and outlet ends of said heat collector units, while computing differences in temperature at said inlet and outlet ends of said heat collector units sensed by said separate temperature detectors, before outputting a decompression control signal to said motor driver of said expansion valve, so that said detected temperature differences will match a predetermined value of said differential temperatures.

* * * * *